US010474394B2

United States Patent
Dev et al.

(10) Patent No.: US 10,474,394 B2
(45) Date of Patent: Nov. 12, 2019

(54) PERSISTENT RESERVATION EMULATION IN SHARED VIRTUAL STORAGE ENVIRONMENTS

(71) Applicant: VMWARE, INC., Palo Alto, CA (US)

(72) Inventors: Rahul Dev, Bangalore (IN); Gautham Swamy, Bangalore (IN); Prasanna Aithal, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 15/955,760

(22) Filed: Apr. 18, 2018

(65) Prior Publication Data

US 2019/0278524 A1    Sep. 12, 2019

(30) Foreign Application Priority Data

Mar. 6, 2018  (IN) .............................. 201841008235

(51) Int. Cl.
   *G06F 3/06*   (2006.01)
   *G06F 9/455*  (2018.01)
   *G06F 9/50*   (2006.01)

(52) U.S. Cl.
   CPC .......... *G06F 3/0664* (2013.01); *G06F 3/0631* (2013.01); *G06F 3/0659* (2013.01); *G06F 9/45558* (2013.01); *G06F 9/5077* (2013.01); *G06F 2009/45583* (2013.01); *G06F 2209/5014* (2013.01)

(58) Field of Classification Search
   CPC .... G06F 3/0604; G06F 3/0659; G06F 3/0631; G06F 9/5077; G06F 9/45552; G06F 2009/5014; G06F 2009/45583
   See application file for complete search history.

(56) References Cited

U.S. PATENT DOCUMENTS

| 6,286,056 | B1* | 9/2001 | Edgar | G06F 3/0619 710/5 |
|---|---|---|---|---|
| 2005/0278465 | A1* | 12/2005 | Qi | G06F 13/387 710/36 |
| 2008/0028145 | A1* | 1/2008 | Lecomte | G06F 3/0614 711/114 |
| 2012/0151095 | A1* | 6/2012 | Cyr | G06F 3/0622 710/5 |

* cited by examiner

*Primary Examiner* — Hiep T Nguyen
(74) *Attorney, Agent, or Firm* — Su IP Consulting

(57) ABSTRACT

Example methods are provided to perform persistent reservation emulation in a shared virtual storage environment that includes a first host supporting a first node and a second host supporting a second node. One example method may comprise detecting a command issued by a first node to command issued by a first node to update information relating to a reservation or registration associated with a virtual disk, and updating persistent reservation information associated with the virtual disk to indicate that the command has been issued by the first node. The method may also comprise determining that the second node either has acknowledged the updated persistent reservation information, or has not acknowledged the updated persistent reservation information within a time interval. The method may further comprise updating the persistent reservation information based on the command.

21 Claims, 11 Drawing Sheets

161/162

```
300 ─── BLOCK #0 (PR INFORMATION BLOCK)

typedef struct VSCSI_PRKey {  ──307
            uint64  rKey;       // reservation key
            uint8   isValid;    // is key valid?
        } __attribute__((packed)) VSCSI_PRKey;

typedef enum {  ──308
            PR_OUT_OPCODE_NOOP=0,
            PR_OUT_OPCODE_RESERVE,
            PR_OUT_OPCODE_RELEASE,
            PR_OUT_OPCODE_CLEAR,
            PR_OUT_OPCODE_PREEMPT,
            PR_OUT_OPCODE_REGISTER_AND_IGNORE,
        } VSCSI_PROutOp;

#define MAX_VMS_SUPPORTED 8
        typedef struct VSCSI_SidecarPRInfo {
            VSCSI_PRKey  keyInfo[MAX_VMS_SUPPORTED]; ──301
            uint32       prReservationHolder; ──302
            uint32       prGeneration; ──303
            // Type of PR OUT command in progress
            VSCSI_PROutOp prOpInProgress; ──304
            // HB block number of initiator
            uint32       prOpNodeSlotNo; ──305
            // incremented for every PR OUT command
            uint64       transactionNum; ──306
        } __attribute__((packed)) VSCSI_SidecarPRInfo;

310 ─── BLOCK #1 (HEARTBEAT BLOCK FOR VM1)* typedef enum {
            STATE_FREE=0,
            STATE_ALLOCATED=1,
        } VSCSI_HBSlotState;

typedef struct VSCSI_SidecarHBInfo {
            VSCSI_HBSlotState  hbSlotState; ──311
            time_t             hbTimeStamp; ──312*
            uint8              uniqueVmUuid[16]; ──313
        } __attribute__((packed)) VSCSI_SidecarHBInfo;

320 ─── BLOCK #2 (HEARTBEAT BLOCK FOR VM2)
330 ─── BLOCK #3 (HEARTBEAT BLOCK FOR VM3)
        ...
        BLOCK #n (HEARTBEAT BLOCK FOR VMn)

340 ─── BLOCK #(n+1) (ACKNOWLEDGEMENT BLOCK FOR VM1)

typedef struct VSCSI_PRFileHBAckInfo {
            uint64  ackedTransaction; ──341
        } __attribute__((packed)) VSCSI_PRFileHBAckInfo;

350 ─── BLOCK #(n+2) (ACKNOWLEDGEMENT BLOCK FOR VM2)
360 ─── BLOCK #(n+3) (ACKNOWLEDGEMENT BLOCK FOR VM3)
        ...
        BLOCK #2n (ACKNOWLEDGEMENT BLOCK FOR VMn)
```

*Updated periodically (e.g., every HB_INTERVAL)

Fig. 3

PERSISTENT RESERVATION EMULATION IN SHARED VIRTUAL STORAGE ENVIRONMENTS

CROSS-REFERENCE TO RELATED APPLICATION

Benefit is claimed under 35 U.S.C. 119(a)-(d) to Foreign Application Serial No. 201841008235 filed in India entitled "PERSISTENT RESERVATION EMULATION IN SHARED VIRTUAL STORAGE ENVIRONMENTS", on Mar. 6, 2018, by VMware, Inc., which is herein incorporated in its entirety by reference for all purposes.

The present application is related in subject matter to U.S. patent application Ser. No. 15/955,694, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtual machines (e.g., also referred to as "nodes") running different operating systems may be supported by the same physical machine (e.g., referred to as a "host"). Each virtual machine is generally provisioned with virtual resources to run an operating system and applications. The virtual resources may include virtual central processing unit (CPU), virtual disk(s), etc.

Small Computer System Interface (SCSI) refers a set of American National Standards Institute (ANSI) standard electronic interfaces that allow personal computers to communicate with peripheral hardware, such as disk drivers, printers, scanners, etc. There are several versions of SCSI, such as SCSI-2, SCSI-3, etc. Compared to SCSI-2 Reservations, SCSI-3 Reservations provide more advanced features. For example, SCSI-2 Reservations were designed for one and only one initiator, and reservations are not persistent after a host reboot or SCSI bus reset. SCSI-3 Persistent Group Reservation (PGR) features facilitate disk reservation that is persistent across failures and allow access by multiple initiators. SCSI-3 PGR commands are cooperative in that reservations and their management may be shared by a group of cooperating nodes. However, conventional persistent reservation approaches may not be applicable in a shared virtual storage environment in which shared access to virtual disks is required.

BRIEF DESCRIPTION OF DRAWINGS

FIG. 3 is a schematic diagram illustrating an example format of PR information associated with virtual disk;

DETAILED DESCRIPTION

Figure 1:
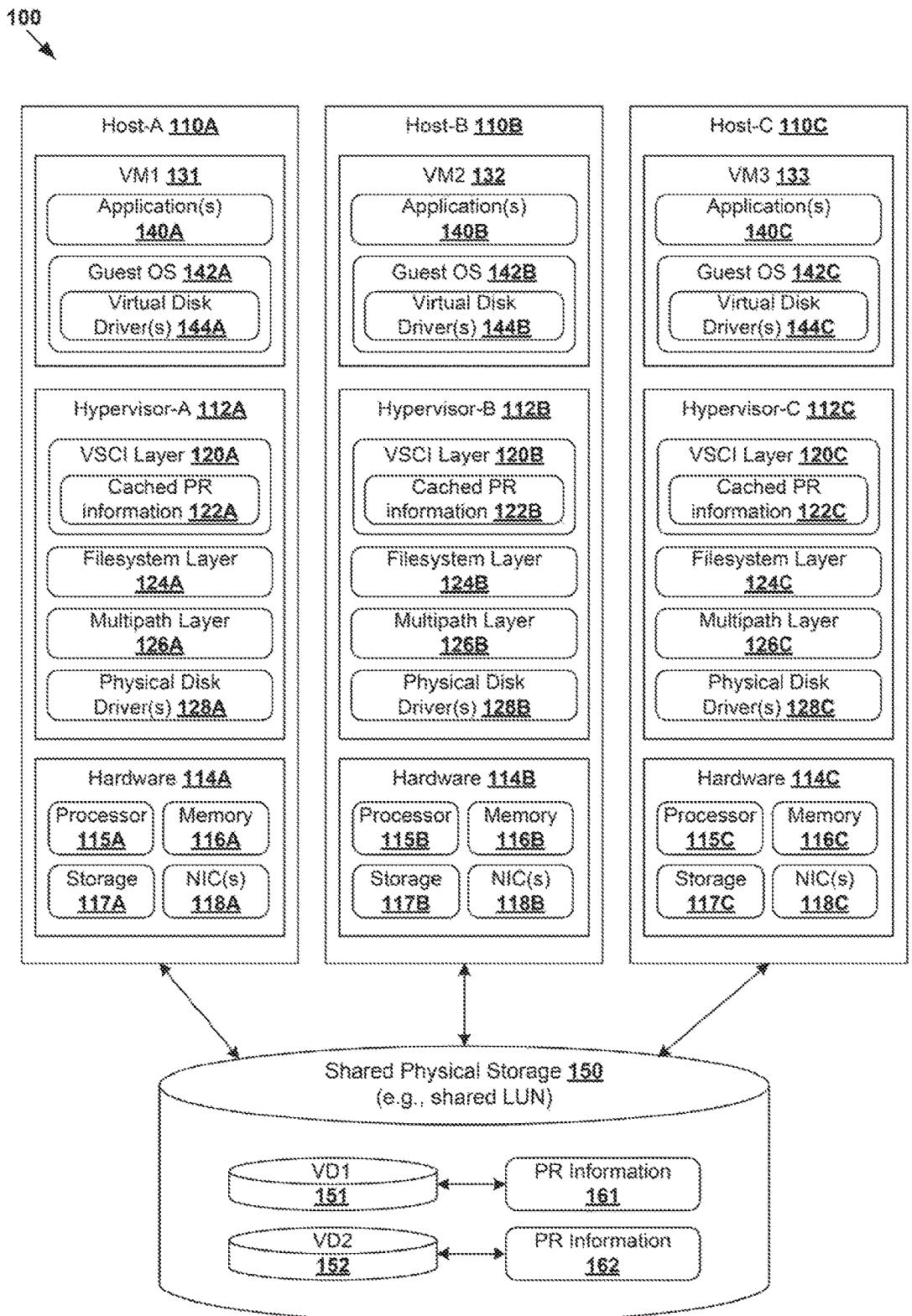
FIG. 1 is a schematic diagram illustrating an example shared virtual storage environment in which persistent reservation (PR) emulation may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Various challenges relating to shared access to virtual disks will now be explained in more detail using FIG. 1. In particular, FIG. 1 is a schematic diagram illustrating example shared virtual storage environment 100 in which persistent reservation (PR) emulation may be performed. It should be understood that, depending on the desired implementation, shared virtual storage environment 100 may include additional and/or alternative components than that shown in FIG. 1. The term "shared virtual storage environment" may refer generally to any suitable environment in which shared access to virtual storage media or medium (e.g., virtual disks 151-152) is required.

In the example in FIG. 1, shared virtual storage environment 100 includes multiple hosts, such as host-A 110A, host-B 110B and host-C 110C that have access to shared physical storage system 150. Each host 110A/110B/110C includes suitable hardware 114A/114B/114C and virtualization software (e.g., hypervisor-A 112A, hypervisor-B 112B, hypervisor-C 112C) to support various nodes in the form of virtual machines (VMs). For example, host-A 110A supports VM1 131, host-B 110B supports VM2 132 and host-C 110C supports VM3 133. In practice, shared virtual storage environment 100 may include any number of hosts (also known as a "computing devices", "host computers", "host devices", "physical servers", "server systems", etc.), where each host may be supporting tens or hundreds of VMs.

Hypervisor 112A/112B/112C maintains a mapping between underlying hardware 114A/114B/114C and virtual resources allocated to VMs 131-133. Hardware 114A/114B/114C includes suitable physical components, such as central processing unit(s) or processor(s) 115A/115B/115C; memory 116A/116B/116C; storage disk(s) 117A/117B/117C accessible via storage controller(s); and physical network interface controllers (NICs) 118A/118B/118C, etc. Virtual resources are allocated to each VM to support application(s) 140A/140B/140C, guest operating system (OS) 142A/142B/142C, virtual disk driver(s) 144A/144B/144C. For example, corresponding to hardware 114A/114B/114C, the virtual resources may include virtual CPU, virtual memory, virtual disk(s), virtual network interface controller (VNIC), etc.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. As used herein, the term "hypervisor" may refer generally to a software layer or component that supports the execution of multiple virtualized computing instances, including system-level software in guest virtual machines that supports namespace containers such as Docker, etc.

In the example in FIG. 1, VMs 131-133 share access to multiple virtual disks, such as VD1 151 ("first virtual disk") and VD2 152 ("second virtual disk") on shared physical storage system 150 (also known as shared physical storage medium, media or disk(s)). Depending on the desired implementation, virtual disks 151-152 may be stored as virtual machine disk (VMDK) files on a shared physical storage system 150, particularly on a filesystem such as virtual machine filesystem (VMFS) volume, etc. Virtual disks 151-152 may be attached to VMs 131-133 and function as system or data disks for VMs 131-133.

Shared physical storage system 150 may include disk drive(s), logical unit(s) (LUN(s)) of a disk array, solid-state non-volatile memory (e.g., Random Access Memory (RAM)), etc. In one example, shared physical storage system 150 may be a shared Storage Area Network (SAN) storage system that supports features such as Atomic Test and Set (ATS) (SCSI_COMPARE_AND_WRITE) commands, SCSI-3 PR, etc. Any additional and/or alternative technology with similar features may be implemented to facilitate access to virtual disks 151-152 on shared physical storage system 150, such as Internet Small Computer Systems Interface (iSCSI), Fibre Channel (FC), Fibre Channel over Ethernet (FCoE), Non-Volatile Memory Express (NVMe), etc. Shared physical storage system 150 may be part of a centralized backend storage solution (e.g., traditional disk arrays), distributed storage device solution, etc.

In practice, shared access to virtual disks 151-152 may be required for any suitable application(s), such as database applications, logical volume management (LVM) applications, etc. In the example in FIG. 1, VMs 131-133 may be configured to work together in a cluster so that users have the impression that only a single system responds to their requests, thus creating an illusion of a single machine. Any suitable technology may be used to form the duster, such as Microsoft Cluster Server® (MSCS), Veritas Cluster Server® (VCS), etc. To communicate with virtual disk 151-152, VMs 131-133 issue SCSI commands to virtual disks 151-152. Since different types of physical storage may be used, these commands are usually encapsulated before they are sent to shared physical storage system 150.

A shared disk filesystem requires a mechanism for concurrency control such that stored data is not corrupted or lost when multiple nodes issue write commands simultaneously. For example, SCSI-3 commands that support Persistent Group Reservations (PGR) are designed to facilitate a group of nodes (e.g., VMs) to work cooperatively on the ownership of a target disk and, where applicable, to coordinate cluster activities. SCSI-3 PR uses a concept of registration and reservation. Each node registers its own "key" with a SCSI-3-compliant system. Multiple nodes registering keys form a membership and establish reservations, such as using reservation type=Write Exclusive All Registrants (WEAR) that enables only registered nodes (i.e., registrants) to perform media-access write operations on the target disk. Other reservation types include Write Exclusive (WE), Exclusive Access (EA), Write Exclusive Registrants Only (WERO) and Exclusive Access Registrants Only (EARO). Reservation type WERO allows only one reservation holder at one time to perform media-access write operations.

Conventionally, SCSI-3 PR approaches are designed for shared access to physical disks. However, such approaches might not be applicable in shared virtual storage environment 100 because multiple virtual disks 151-152 may be stored on a single shared physical storage system 150. As such, if reservation is taken using the conventional approach, only one virtual disk will be accessible by the group of nodes. One approach to address this problem is to use Raw Device Mapping (RDM), which is a mapping file that acts as a proxy for a raw physical storage device to allow direct access to the physical storage device. However, in practice, some users may find RDM less desirable because it incurs additional configuration overhead and generally works against the principle of virtualization.

PR Emulation

According to a first aspect of the present disclosure, SCSI-3 PR Commands may be emulated to facilitate shared access to virtual disks 151-152 among a group of nodes, such as VMs 131-133. This way, instead of issuing PR commands directly to shared physical storage system 150, the commands may be emulated for each virtual disk 151/152. In the example in FIG. 1, emulation may be performed by hypervisor 112A/112B/112C in a manner that is transparent to VMs 131-133. It should be understood that examples of the present disclosure do not necessitate the use of a particular type of backend storage or hypervisor architecture, or VMs 131-133 to form a cluster, etc.

According to examples of the present disclosure, each virtual disk 151/152 may be associated with PR information 161/162 (e.g., PR files where information associated with SCSI-3 PR is stored). PR information 161/162 may be used as an arbitrator to decide which VM should own shared virtual disk 151/152. VMs that share virtual disk 151/152 cooperate and follow a certain protocol to access and update PR information 161/162. In practice, PR information 161/162 may be stored on the same filesystem on which virtual disks 151-152 are stored.

In the following, various examples will be discussed using two types of SCSI-3 PR commands: Persistent Reservation IN (PRIN) commands and Persistent Reservation OUT (PROUT) commands. PRIN commands are example commands to obtain or read information relating to reservation(s) or registration(s), such as to read a reservation key of a registrant (e.g., PRIN READ-KEY), read information relating to a reservation by a registrant (e.g., PRIN READ-RESERVATION), etc. PROUT commands are example commands to update information relating to reservation(s) or registration(s), such as to register or unregister a reservation key (e.g., PROUT REGISTER-AND-IGNORE), create or release persistent reservation on the disk (e.g., PROUT RESERVE or RELEASE), etc. Here, the term "update" may refer to adding, removing or modifying any suitable information relating to reservation(s) or registration(s). PROUT is also known as Persistent Reserve OUT, and PRIN as Persistent Reserve IN.

Figure 2:
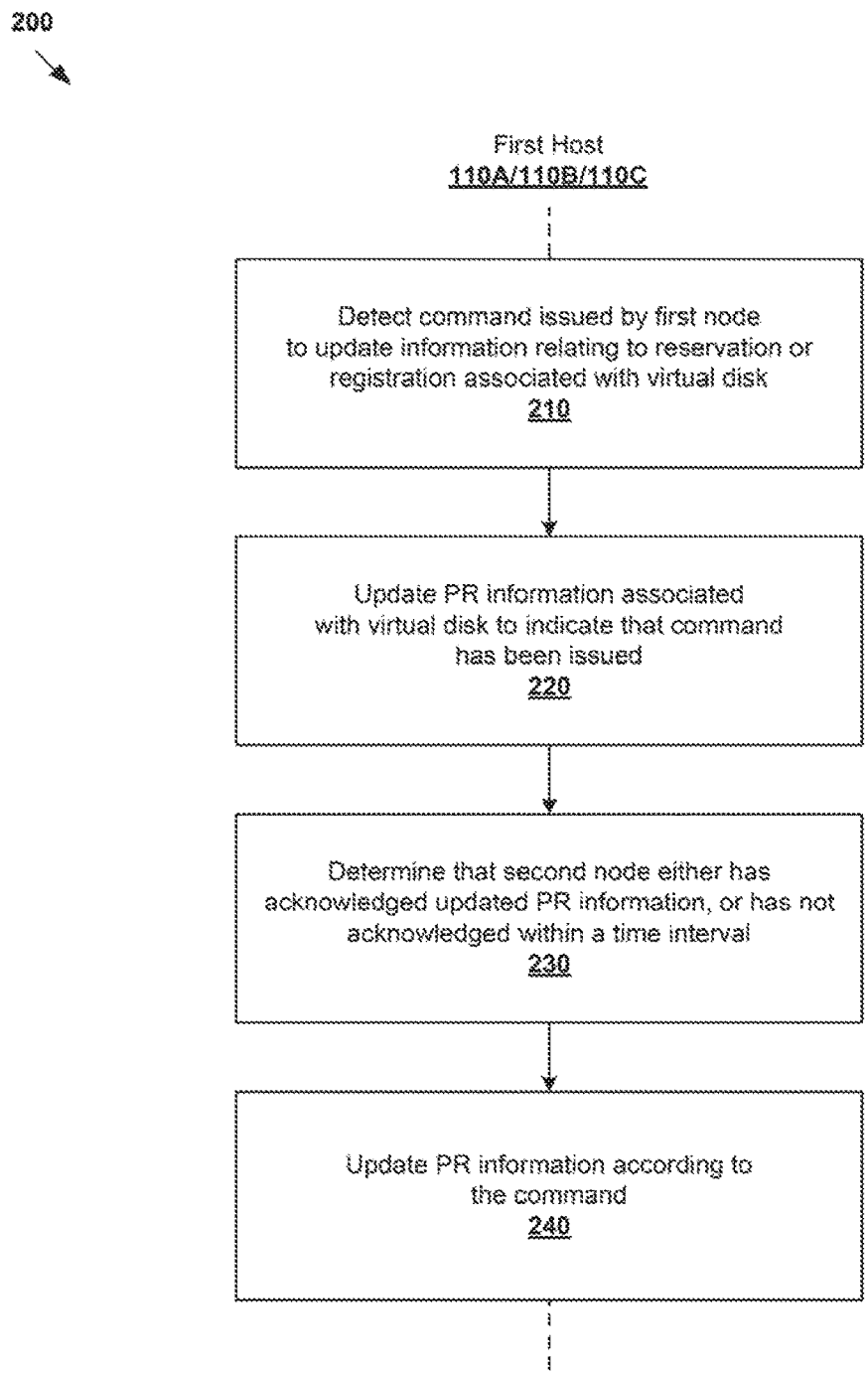
FIG. 2 is a flowchart of an example process for a first host to perform PR emulation in a shared virtual storage environment.

In more detail, FIG. 2 is a flowchart of example process 200 for a first host to perform PR emulation in shared virtual storage environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In the following, host-A 110A is used as an example "first host," VM1 131 as "first node," host-B 110B or host-C 110C as "second host," VM2 132 or VM3 133 as "second node" and VD1 151 as "virtual disk." PROUT commands will be used as example commands to update information relating to a reservation or registration associated with a virtual disk. Example process 200 may be implemented by hypervisor 112A at host-A 110A, such as using VSCSI layer 120A, etc.

At 210 in FIG. 2, host-A 110A detects a PROUT command issued by a VM1 131 to VD1 151 accessible by the VM1 131 and the VM3 133. At 220, host-A 110A updates PR information 161 associated with the VD1 151 to indicate that the PROUT command has been issued by the VM1 131. In the example in FIG. 1, PR information 161 is accessible by both host-A 110A and host-C 110C. PR information 161 is stored on shared physical storage system 150 on which VD1 151 is stored.

As will be discussed further using FIG. 3 to FIG. 6, prior to updating PR information 161 at block 220, block 210 may include determining that the PROUT command is valid and quiescing other commands to VD1 151. Block 220 may involve updating parameters in PR information 161, such as a first parameter to indicate that the PROUT command has been issued (e.g., prOpInProgress at 304 in FIG. 3), a second parameter to identify the first node (e.g., prOpNodeSlot at 305), and a third parameter to indicate a transaction number associated with the PROUT command (e.g., transactionNum at 306). PR information 161 may be updated using any suitable locking mechanism (e.g., ATS (SCSI_COMPARE_AND_WRITE) command) to prevent or reduce the likelihood of data corruption caused by simultaneous attempts to update PR information 161.

At 230 in FIG. 2, host-A 110A determines that VM 132/133 either has acknowledged the updated PR information, or has not acknowledged the updated PR information within a time interval. As will be discussed further using FIG. 3 to FIG. 6, block 230 may involve obtaining a latest copy of PR information 161 that includes acknowledgement blocks and/or heartbeat blocks allocated to respective VM2 132 and VM3 133. In one example, in response to determination that an acknowledgement block allocated to VM2 132 has been updated, it is determined that VM2 132 has acknowledged the updated PR information and quiesced commands to VD1 151. In another example, in response to determination that an acknowledgement block allocated to VM3 133 has not been updated and a heartbeat block allocated to VM3 133 has not been updated within a time interval, it is determined that VM3 133 has not acknowledged the updated PR information.

At 240 in FIG. 2, host-A 110A updates PR information 161 based on the PROUT command. As will be discussed further using FIG. 3 to FIG. 6, once the PROUT command is completed, commands to VD1 151 may be unquiesced. Further, host-A 110A may update PR information 161 associated with the VD1 151 to indicate that the PROUT command has completed. Various examples will be discussed further using FIG. 3 to FIG. 7 below.

Example PR Information

According to examples of the present disclosure, VSCSI layer 120A/120B/120C may store a copy of PR information 161/162 associated with virtual disk 151/152 in the form of cached PR information 122A/122B/122C. Periodic polling may be performed to determine whether there has been any new PROUT command issued by a VM, such as to reserve shared virtual disk 151/152, etc. Depending on the desired implementation, any suitable polling interval may be used, such as POLL_INTERVAL=1 second, etc. On one hand, if POLL_INTERVAL is too short, periodic polling may generate a lot of extra traffic to shared physical storage system 150 in the form of small reads. On the other hand, if POLL_INTERVAL is too high, the latency of PROUT commands will increase, which results in delayed failover of clustered applications.

FIG. 3 is a schematic diagram illustrating example format of PR information 161/162 associated with virtual disk 151/152. The total number of blocks may be 2n+1, including one PR information block 300 (i.e., Block #0), n heartbeat blocks (i.e., Block #1 to Block #n) and n acknowledgement blocks (i.e., Block #(n+1) to Block #(2n)). Variable n represents the maximum number of nodes (e.g., VMs in a cluster) that have access to virtual disk 151/152. Each block may be of any suitable size, such as a single disk sector in size so that each block may be updated atomically.

(a) SCSI-3 PR Information Block (Block #0)

In the example in FIG. 3, PR information block 300 includes a structure (denoted as VSCSI_SidecarPRInfo) to store various SCSI-3 PR parameters, such as PR key structure 301, reservation holder 302 and PR generation number 303. In particular, PR key structure 301 (denoted as keyInfo) stores a reservation key (denoted as rKey) for each registered I_T nexus. For example, if a maximum of eight nodes are supported (also denoted as "MAX_VMS_SUPPORTED"), a maximum of eight reservation keys will be stored in keyInfo. Each reservation key may be eight bytes in length according to the SCSI specification (see corresponding VSCSI_PRKey structure 307). For WERO type of PR, reservation holder 302 (denoted as prReservationHolder) identifies a single reservation holder. PR Generation number 303 (denoted as prGeneration) is a 32-bit wrapping counter that is incremented during the successful processing of any PROUT command (as per SCSI specification).

State prOpInProgress (see parameter 304) may be set by VSCSI layer 120A/120B/120C to indicate that a PROUT command has been issued and is in progress. This parameter may be one of the following types (see corresponding 308): NOOP=0 (i.e., none in progress); RESERVE (i.e., RESERVE service action); RELEASE (i.e., RELEASE service action); CLEAR (i.e., CLEAR service action); PREEMPT (i.e., PREEMPT service action); and REGISTER_AND_IGNORE (i.e., REGISTER-AND-IGNORE service action). Any suitable code(s) may be used to indicate additional and/or alternative service action(s) other than that shown in FIG. 3.

For example, a PROUT REGISTER-AND-IGNORE service action may be issued to update information relating to a registration, particularly to register a reservation key with a target virtual disk while ignoring any previously registered key. Following a PROUT REGISTER-AND-IGNORE service action, a PROUT RESERVE service action request may be issued to update information relating to a reservation, particularly to reserve the target virtual disk with the reservation key. The reservation may be subsequently released using a PROUT RELEASE service action request. A PROUT PREEMPT service action request may be issued to pre-empt an existing reservation, and a PROUT CLEAR service action to clear all registrants and reservation information from the target virtual disk.

Heartbeat block number denoted as prOpNodeSlotNo (see parameter 305) may be set by VSCSI layer 120A/120B/120C to identify a master or coordinator node that issues the PROUT command. For example, if VM1 131 is the master node that initiates a PROUT command, first VSCSI layer 120A may update this parameter to prOpNodeSlotNo=0 (using array indexing that starts from 0) based on first heartbeat block 310 allocated to VM1 131. Heartbeat blocks 310-330 will be explained further below. Transaction number denoted as transactionNum (see parameter 306), which is different from prGeneration, is an internal counter used by the protocol that is incremented every time a PROUT command is initiated.

(b) Heartbeat Blocks

Heartbeat blocks 310-330 (Block #1 to Block #n) may be allocated to respective VMs 131-133 to facilitate a heartbeat mechanism among VMs 131-133. For example, when VM1 131 powers ON at host-A 110A, first VSCSI layer 120A searches for a free heartbeat block 310 (e.g., whether hbSlotState=STATE_FREE) and allocates it to VM1 131. Once allocated, first VSCSI layer 120A updates state 311 in first heartbeat block 310 to indicate that it is allocated (e.g., hbSlotState is updated to STATE_ALLOCATED). Further, first VSCSI layer 120A updates first heartbeat block 310 to specify a Universally Unique Identifier (UUID) associated with VM1 131 (e.g., uniqueVmUuid="VM1"; see 313).

In practice, a free heartbeat block may be allocated to a VM by changing its state hbSlotState from STATE_FREE to STATE_ALLOCATED. The heartbeat block may be updated using an ATS (SCSI_COMPARE_AND_WRITE) command, or any other locking mechanism. The locking mechanism ensures that if two hosts attempt to allocate a particular block simultaneously, only one of them will be successful while the other will fail with an ATS miscompare error. The unsuccessful host may retry again, or find a free heartbeat block. If a particular VM crashes and fails to release a heartbeat block, it can reclaim the same block that specifies its UUID. Depending on the desired implementation (not shown in FIG. 3 for simplicity), heartbeat blocks 310-330 may be released when corresponding VMs 131-133 are powered OFF. For example, when VM1 131 is powered OFF, first VSCSI layer 120A may release first heartbeat block 310 by updating state 311 from allocated (i.e., STATE_ALLOCATED) to free (i.e., STATE_FREE). The released heartbeat block may be reallocated.

Once allocated, first VSCSI layer 120A may update timestamp parameter 312 (denoted as hbTimeStamp) in first heartbeat block 310 on behalf of VM1 131 to indicate the aliveness of VM1 131. First heartbeat block 310 may be updated periodically at any suitable interval, such as HB_INTERVAL=3 seconds, etc. If hbTimeStamp in first heartbeat block 310 cannot be updated successfully, first VSCSI layer 120A may attempt again until a maximum number of retry is reached (e.g., three times). In this case, in response to determination that access to shared VD1 151 is lost based on the failed attempt(s) to update first heartbeat block 310, first VSCSI layer 120A proceeds to quiesce all commands to shared VD1 151. This is to ensure that a failed node does not modify any content on the shared disk to prevent or reduce the likelihood of any data corruption.

As used in the present disclosure, the term "quiesce" may refer generally to aborting any in-flight commands and/or blocking any new commands to a particular virtual disk. Depending on the desired implementation, the blocked commands may be queued (e.g., in a linked list) until quiescing is over. After quiescing the commands, first VSCSI layer 120A also marks cached PR information 120A (i.e., a local copy of PR information 161) invalid, such as by setting an in-memory variable to indicate invalidity. The maximum number of retry ensures that the commands are quiesced within a suitable time interval, such as HB_LEASE_TIME=16 seconds. After HB_LEASE_TIME has elapsed, VM1 131 may be considered to be dead, inactive or non-responding by other VMs 132-133 sharing access to VD1 151. The commands may be unquiesced once first heartbeat block 310 is updated again.

Similarly, when VM2 132 powers ON at host-B 110B, second VSCSI layer 120B allocates second heartbeat block 320 (see "Block #2") to VM2 132. At every HB_INTERVAL, second VSCSI layer 120B updates hbTimeStamp (not shown for simplicity) to indicate the aliveness of VM2 132. When VM3 133 powers ON at host-C 110C, third VSCSI layer 120C allocates third heartbeat block 330 (see "Block #3") to VM3 133 and updates hbTimeStamp (not shown for simplicity) periodically.

(c) Acknowledgement Blocks

Acknowledgement blocks 340-360 (Block #(n+1) to Block #2n) may be allocated to respective VMs 131-133 to facilitate PR emulation. Each acknowledgement block specifies an acknowledgement parameter (e.g., ackedTransaction 341 in first acknowledgement block 340 allocated to VM1 131) that may be updated to indicate acknowledgement of a PROUT command. The acknowledgement parameter may be updated to acknowledge a particular transaction number 306 (denoted as transactionNum). Some examples will be discussed below.

Example PR Emulation

Example PR emulation will be explained using FIG. 4 to FIG. 6. Three example scenarios will be explained: acknowledgement by all second nodes (see FIG. 4); no acknowledgement within a time interval (see FIG. 5) and loss of storage connectivity at a master node (see FIG. 6). Example process 400/500/600 may include one or more operations, functions, states, or actions illustrated at 410-475, 510-530 and 610-640. The various operations, functions or actions may be combined into fewer blocks, divided into additional blocks, and/or eliminated depending on the desired implementation. In the following examples, host-A 110A will be used as an example "first host," VM1 131 as "first node," host-B 110B or host-C 110C as "second host," VM2 132 or VM3 133 as "second node" and VD1 151 as "virtual disk."

(a) Scenario 1: All Acknowledgement(s) Received

A first example scenario will be explained using FIG. 4, which is a schematic diagram illustrating of first example detailed process 400 of PR emulation in shared virtual storage environment 100. At 410 in FIG. 4, VSCSI layer 120B/120C performs periodic polling to determine whether a new PROUT command has been issued by any other VM. If yes, cached PR information 122A/122B/122C will be updated, but otherwise, no action is taken. If not, polling is performed again at the next interval. (see 440-450 below). As shown at 401 in FIG. 4, PR information 161 indicates that no PROUT command is in progress based on propInProgress=NOOP and prOpNodeSlotNo=−1.

Figure 4:
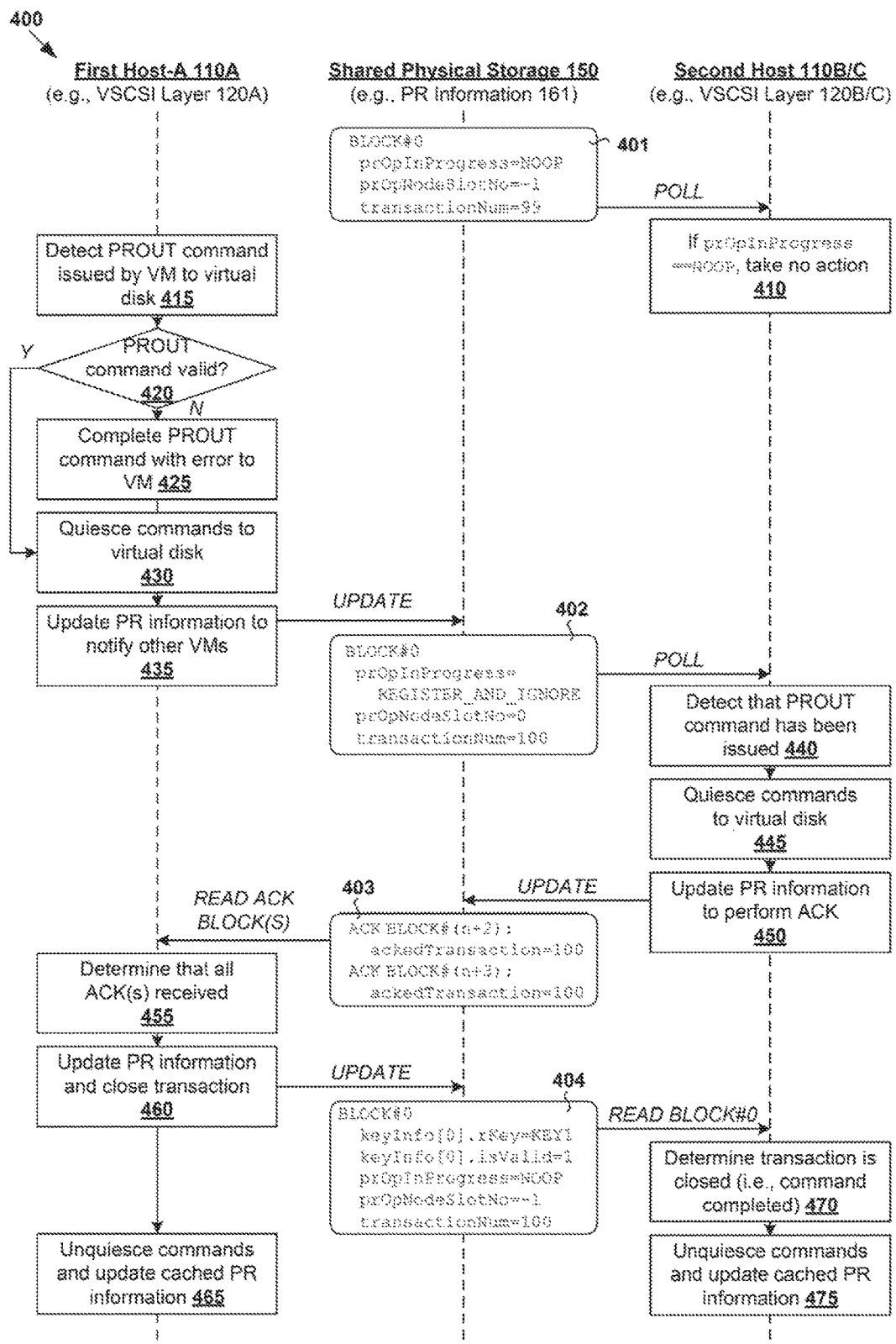
FIG. 4 is a schematic diagram Illustrating of a first example detailed process of PR emulation in a shared virtual storage environment.

At 415 and 420 in FIG. 4, in response to detecting a PROUT command issued by VM1 131 (i.e., master node) to VD1 151, first VSCSI layer 120A determines whether the PROUT command is valid and allowed based on cached PR information 122A. At 425, if the PROUT command is invalid, the PROUT command will be completed with an appropriate error to VM1 131.

At 430 in FIG. 4, in response to determination that the PROUT command received from VM1 131 is valid and allowed, VD1 151 will be quiesced where all new (i.e., subsequent) commands from VM1 131 to VD1 151 are blocked. Depending on the desired implementation, the blocked commands may be queued (e.g., in a linked list) for later retry. At 435 in FIG. 4, first VSCSI layer 120A updates PR information 161 associated with VD1 151 to notify VM2 132 and VM3 133 (i.e., client nodes) and corresponding VSCSI layers 120B-C that a PROUT command has been issued.

As shown at 402 in FIG. 4, first VSCSI layer 120A updates various parameters in PR information 161, including setting prOpInProgress to a value associated with the command type (e.g., REGISTER_AND_IGNORE), setting prOpNodeSlotNo=0 based on first heartbeat block 310 allocated to master node=VM1 131 and incrementing transactionNum, such as from 99 to 100.

At 440 in FIG. 4, after performing periodic polling to obtain updated PR information 161 associated with VD1 151, VSCSI layer 120B/120C identifies updated prOpInProgress=REGISTER_AND_IGNORE, which indicates that a PROUT command has been issued. In response, at 445, VSCSI layer 120B at host-B 110B quiesces all commands from VM2 132 to VD1 151, such as by aborting in-flight commands and blocking all commands. Similarly, VSCSI layer 120C at host-C 110C quiesces all commands from VM3 133 to VD1 151.

At 450 in FIG. 4, VSCSI layer 120B/120C updates PR information 161 to acknowledge the updated prOpInProgress. Depending on the HB_INTERVAL, VSCSI layer 120B/120C also updates heartbeat block 320/330 to indicate the aliveness of corresponding VM 132/133. Although not shown in FIG. 4, first VSCSI layer 120A may also update first heartbeat block 310 allocated to VM1 131 every HB_INTERVAL to indicate to VM2 132 and VM3 133 (as well as respective VSCSI layers 120B-C) that VM1 131 is still alive.

As shown at 403 in FIG. 4, second VSCSI layer 120B successfully updates acknowledgement block 350 (Block #(n+2)) by setting ackedTransaction=100 based on transactionNum=100 in PR information block 300 (Block #0). Further, although not shown in FIG. 4, second VSCSI layer 120B updates hbTimeStamp in heartbeat block 320 to indicate the aliveness of VM2 132. Similarly, third VSCSI layer 120C successfully updates acknowledgement block 360 (Block #(n+3)) and heartbeat block 330 (Block #3) in PR information 161.

At 455 in FIG. 4, first VSCSI layer 120A checks acknowledgement blocks 350-360 to determine whether acknowledgement has been received from each client node. The client node may be identified from heartbeat blocks 340-350 that have been allocated (i.e., hbSlotState= STATE_ALLOCATED). At 460 in FIG. 4, in response to determination that all acknowledgement blocks have been updated, first VSCSI layer 120A proceeds to update PR information 161 according to the PROUT command issued by VM1 131, and closes the transaction upon completion.

As shown at 404 in FIG. 4, the keyInfo structure in PR information block 300 (block #0) is updated according to the PROUT command. To close the transaction, first VSCSI layer 120A updates PR information 161 to reset prOpInProgress=NOOP and prOpNodeSlotNo=−1, thereby notifying client nodes that the PROUT command has been completed and no longer in progress. At 465 in FIG. 4, once the command is completed, first VSCSI layer 120A unquiesces commands to VD1 151 and updates cached PR information 122A based on the latest copy of PR information 161.

At 470 in FIG. 4, after obtaining updated PR information 161 associated with VD1 151, VSCSI layer 120B/120C determines that the PROUT command issued by VM1 131 is no longer in progress (i.e., transaction has closed) based on updated prOpInProgress=NOOP. In response, at 475, VSCSI layer 120B/120C unquiesces commands from VM 132/133 to VD1 151 and updates cached PR information 122B/122C based on the latest copy of PR information 161. As such, once the transaction is over, the PR information is consistent among hosts 110A-C.

(b) Scenario 2: Acknowledgement(s) Not Received Within a Time Interval

A second example scenario will be explained using FIG. 5, which is a schematic diagram illustrating of second example detailed process 500 of PR emulation in shared virtual storage environment 100. Blocks 410-435 and 460-465 in FIG. 5 are the same as corresponding blocks in FIG. 4, the explanation of which will not be repeated here for brevity. Unlike the first scenario in FIG. 4, VM3 133 on host-C 110C loses storage connectivity with VD1 151 (see 510 in FIG. 5) and is unable to update its allocated acknowledgement block 360, as well as heartbeat block 330 within HB_LEASE_TIME.

Figure 5:
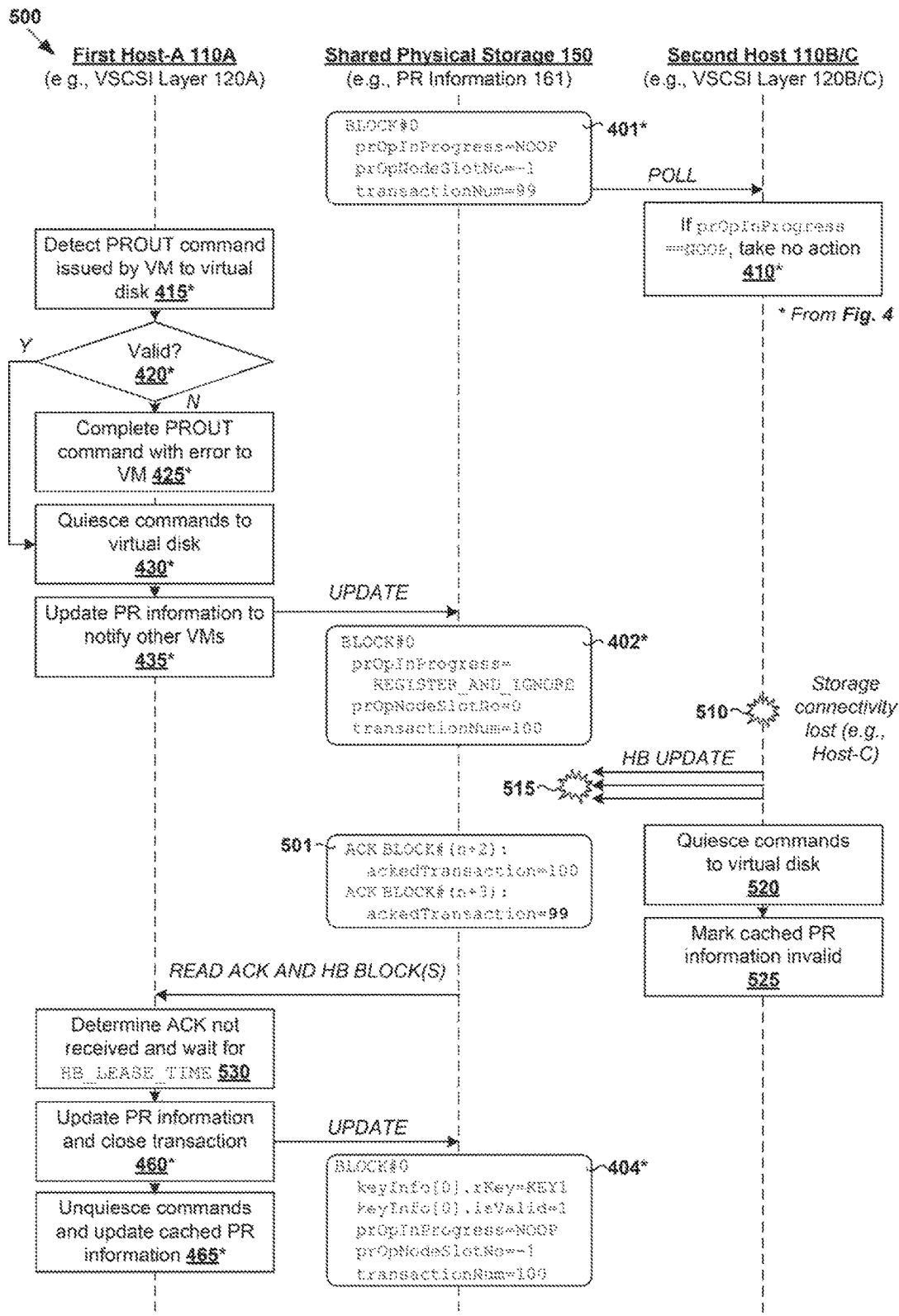
FIG. 5 is a schematic diagram illustrating of a second example detailed process of PR emulation in a shared virtual storage environment.

As shown at 501 in FIG. 5, ackedTransaction=99 in acknowledgement block 360 indicates that the latest transactionNum=100 has not been acknowledged. Further, as shown at 515, hbTimeStamp in heartbeat block 330 allocated to VM3 133 has not been updated due to multiple consecutive heartbeat failures. In practice, acknowledgement block 360 and/or heartbeat block 330 may not be updated due to various reasons, such as power failure, software failure (e.g., VM or VSCSI layer crashing), hardware failure, network failure (e.g., loss of connection), processing load that causes excessive delay, a combination thereof, etc. According to the heartbeat mechanism described using FIG. 3, after HB_LEASE_TIME has elapsed, third VSCSI layer 120C quiesces all commands and invalidates its cached PR information 122C. See corresponding 520 and 525 in FIG. 5.

At host-A 110A, based on ackedTransaction=100 in acknowledgement block 350, first VSCSI layer 120A determines that VM2 132 has acknowledged updated PR information 161 with transactionNum=100 and second VSCSI layer 120B has quiesced commands from VM2 132 to VD1 151. In contrast, acknowledgement block 360 allocated to VM3 133 has not been updated based on ackedTransaction=99, which does not reflect the latest transactionNum=100.

At 530 in FIG. 5, first VSCSI layer 120A determines that VM3 133 has not acknowledged updated PR information 161 based on acknowledgement block 360. Also, first VSCSI layer 120A determines the aliveness of VM3 133 by checking heartbeat block 330 allocated to VM3 133. If not (i.e., HB_LEASE_TIME has not elapsed), first VSCSI layer 120A continues to wait for the acknowledgement. If yes (i.e., HB_LEASE_TIME has elapsed), first VSCSI layer 120A concludes that VM3 133 is no longer alive and proceeds to blocks 460-465 (as explained using FIG. 4). In other words, VM3 133 has not acknowledged updated PR information 161 within a particular time interval.

(c) Scenario 3: Loss of Storage Connectivity at First Node

A third example scenario will be explained using FIG. 6, which is a schematic diagram illustrating of third example detailed process 600 of PR emulation in shared virtual storage environment 100. Blocks 410-450 in FIG. 5 are the same as corresponding blocks in FIG. 4, the explanation of which will not be repeated here for brevity. Unlike the first scenario in FIG. 4, master node VM1 131 and/or first VSCSI layer 120A may lose storage connectivity with VD1 151 before the PROUT command is completed. In this case, first VSCSI layer 120A is unable to complete the PROUT command and reset propInProgress. In this case, failure handling may be performed as follows.

Figure 6:
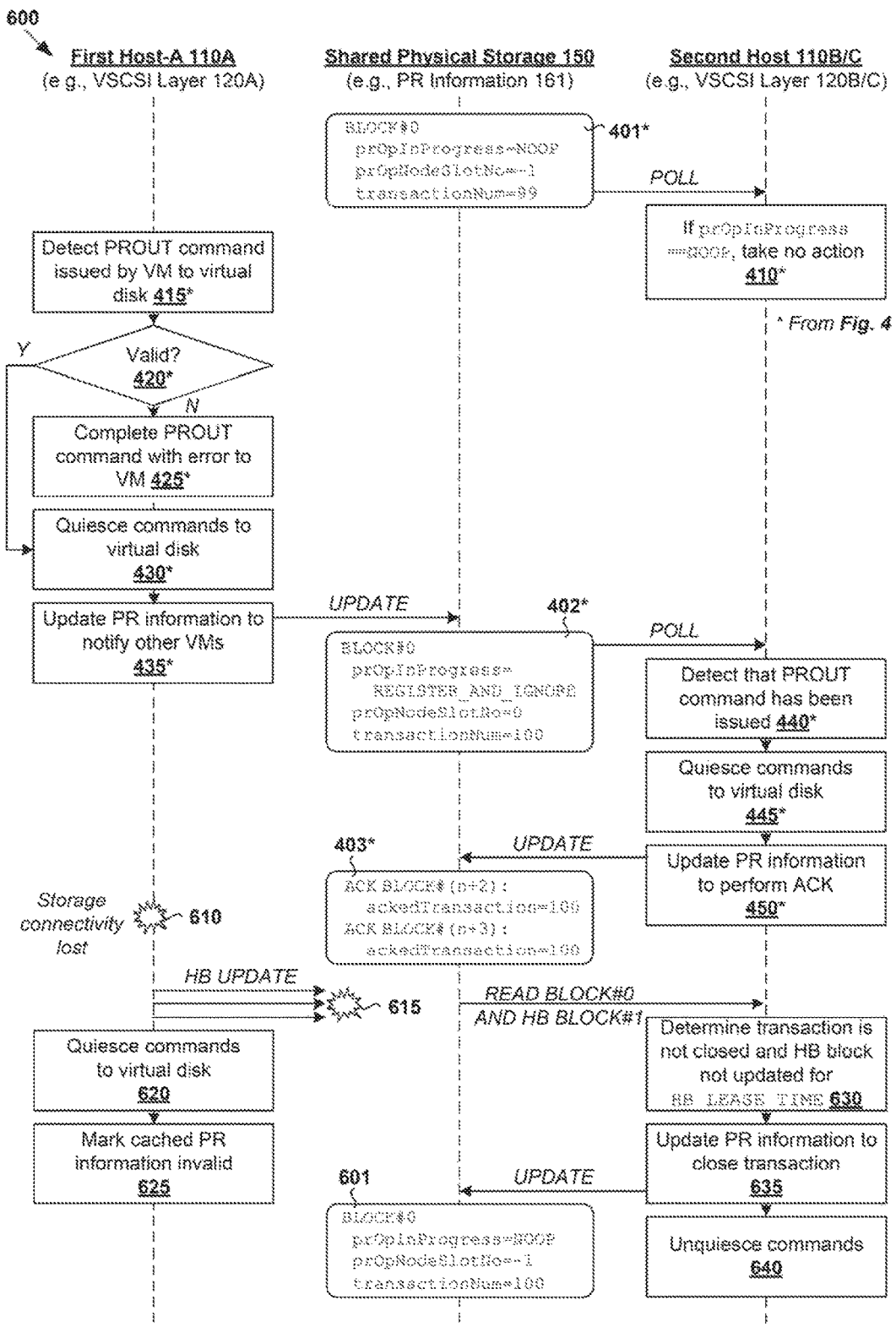
FIG. 6 is a schematic diagram illustrating of a third example detailed process of PR emulation in a shared virtual storage environment.

Referring first to 610 and 615 in FIG. 6, due to the loss of storage connectivity, first VSCSI layer 120A is unable to update hbTimeStamp in heartbeat block 310 allocated to VM1 131. The loss of storage connectivity may be due to any suitable failure (e.g., power, hardware, software, network, any combination thereof, etc.). According to the heartbeat mechanism explained using FIG. 3, first VSCSI layer 120A may detect that it has lost connectivity with VD1 151 after multiple consecutive heartbeat failures to update hbTimeStamp in first heartbeat block 310 allocated to VM1 131 (e.g., after HB_LEASE_TIME has elapsed). In this case, at 620 and 625 in FIG. 6, first VSCSI layer 120A quiesces all commands to VD1 151 and invalidates its cached PR information 122A.

At 630 in FIG. 6, in response to determination that propInProgress has not been reset to indicate the completion of a PROUT command (i.e., transaction is not closed), VSCSI layer 120B/120C may determine whether the master node has lost storage connectivity with VD1 151. As explained using FIG. 3, VSCSI layer 120B/120C may identify master node=VM1 131 based on prOpNodeSlotNo=0 in PR information block 300 (i.e., Block #0), which identifies first heartbeat block 310 (i.e., Block #1) allocated to VM1 131.

For example, to determine whether VM1 131 is no longer alive, VSCSI layer 120B/120C may check hbTimeStamp in first heartbeat block 310 and determine whether HB_LEASE_TIME has elapsed since hbTimeStamp was last updated. If not, VSCSI layer 120B/120C continues to wait for the completion of the PROUT command issued by VM1 131. Otherwise (i.e., HB_LEASE_TIME has elapsed), VSCSI layer 120B/120C assumes that VM1 131 is no longer alive and has lost access to VD1 151. In this case, at 635 and 640 in FIG. 6, VSCSI layer 120B/120C updates PR information 161 by resetting prOpInProgress=NOOP to close the transaction, and unquiesces commands to VD1 151. Depending on the desired implementation, it is not necessary to update cached PR information 122B/122C because the current version is still valid and commands may be issued to VD1 151.

All updates to PR information block 300 (Block #0 in FIG. 3) are performed using ATS (SCSI_COMPARE_AND_WRITE) commands. This ensures that if multiple hosts attempt to update PR information block 300 simultaneously, only one of them will be successful. For example, second VSCSI layer 120B may be successful in resetting prOpInProgress. In this case, once third VSCSI layer 120C obtains updated PR information 161 at the next polling interval, VSCSI layer 120C unquiesces commands to VD1 151 based on updated propInProgress=NOOP.

Processing PRIN and Other SCSI Commands

Figure 7:
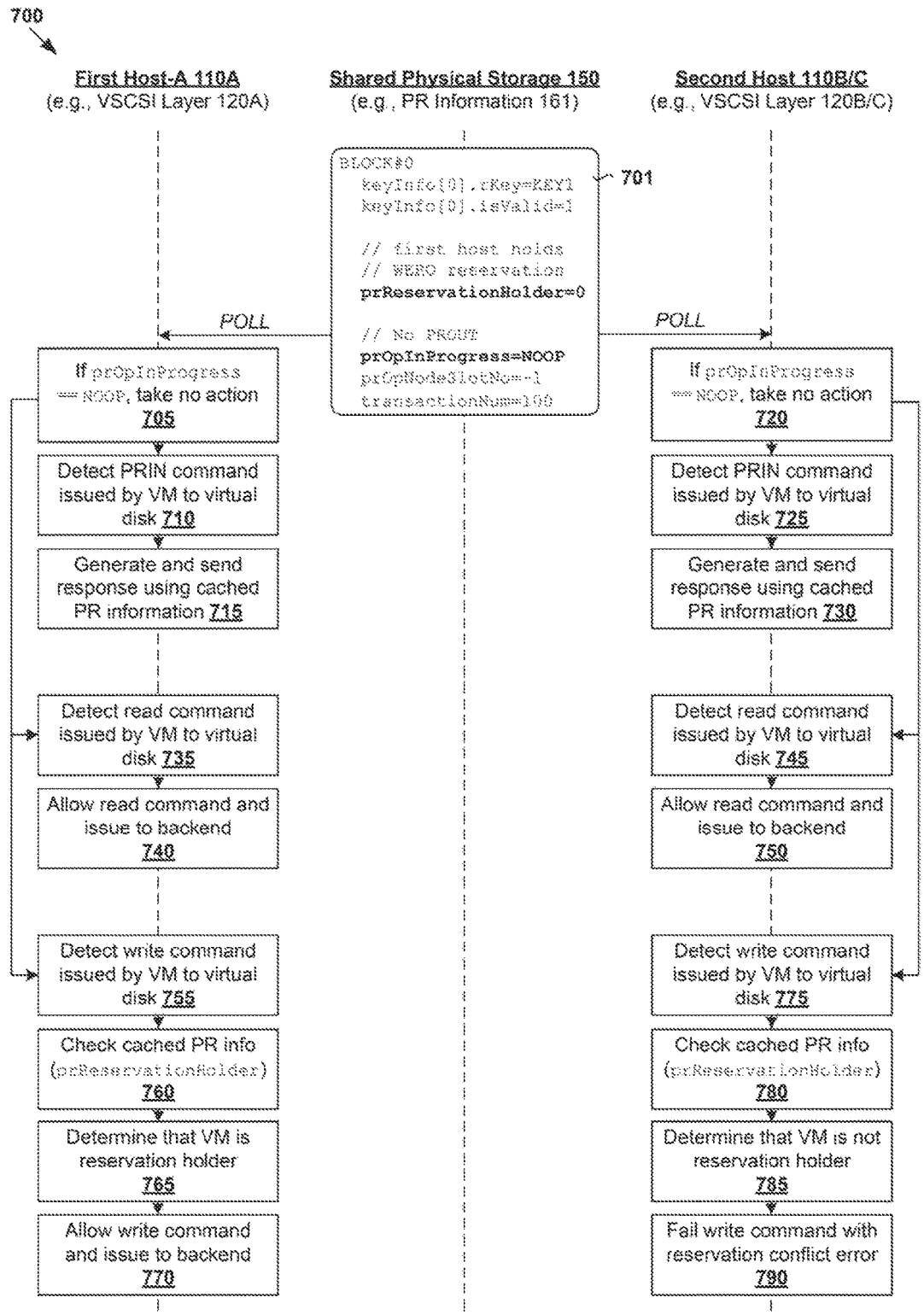
FIG. 7 is a schematic diagram illustrating of a fourth example detailed process of PR emulation in a shared virtual storage environment.

FIG. 7 is a schematic diagram illustrating of fourth example detailed process 700 for PR emulation in shared virtual storage environment 100. Example process 700 may include one or more operations, functions, states, or actions illustrated at 705-790. The various operations, functions or actions may be combined into fewer blocks, divided into additional blocks, and/or eliminated depending on the desired implementation. Similar to the examples in FIG. 4 to FIG. 6, host-A 110A will be used as an example "first host," VM1 131 as "first node," host-B 110B or host-C 110C as "second host," VM2 132 or VM3 133 as "second node" and VD1 151 as "virtual disk."

(a) PRIN Commands

As shown at 701 in FIG. 7, consider a scenario where first VSCSI layer 120A has registered PR key=KEY1 using the PROUT REGISTER-AND-IGNORE command discussed using FIG. 4 to FIG. 6. A latest copy of PR information 161 also specifies VM1 131 to be the current reservation holder (WERO) using prReservationHolder=0 (i.e., index=0 associated with first heartbeat block 310). Since VM1 131 is the current reservation holder, all read, write and PRIN commands issued by VM1 131 are allowed.

In more detail, at 705 in FIG. 7, first VSCSI layer 120A performs periodic polling to determine whether a new PROUT command has been issued by any other VM. In the example in FIG. 7, since prOpInProgress=NOOP, it is not necessary to update cached PR information 122A. At 710, in response to detecting a PRIN command issued by VM1 131 to read information relating to reservation(s) or registration(s) associated with virtual disk 151, first VSCSI layer 120A generates and sends a response to VM1 131 based on cached PR information 122A, thereby emulating the PRIN command. Otherwise (not shown for simplicity), the PRIN command will be blocked because a PROUT command is already in progress.

For example, in response to detecting a PRIN command specifying a READ-KEY service action, first VSCSI layer 120A generates and sends a response that specifies registered keys from keyInfo structure (see 301 in FIG. 3). In another example, in response to detecting a PRIN command specifying a READ-RESERVATION service action, first VSCSI layer 120A generates and sends a response that specifies the current prReservationHolder (see 302 in FIG. 3) based on cached PR information 122A.

Similarly, at second host 110/1100, VSCSI layer 120B/120C may process a PRIN command according to blocks 720-730 in FIG. 7. In particular, in response to detecting a PRIN command and determination that propInProgress=NOOP, VSCSI layer 120B/120C generates and sends a response to VM 132/133 based on cached PR information 122B/122C.

(b) Read and Write Commands

Besides PROUT and PRIN commands, VSCSI layer 120A/120B/120C may handle "other" SCSI commands that are not related to PR. In practice, example SCSI-commands may include WRITE, WRITE ATTRIBUTE, WRITE BUFFER, READ, SET DEVICE IDENTIFIER, SET TARGET PORT GROUPS, MODE SENSE, MODE SELECT, TEST UNIT READY, RESERVE, etc.

At 735 and 740 in FIG. 7, in response to detecting a read command issued by VM1 131, first VSCSI layer 120A determines that the read command is allowed and issues the read command to the backend storage. Similarly, blocks 745-750 may be performed by VSCSI layer 120B/120C at second host 110B/110C to handle read commands.

At 755 and 760 in FIG. 7, in response to detecting a write command issued by VM1 131, first VSCSI layer 120A determines whether to allow or block the write command by checking the current reservation holder based on cached PR information 122A. At 765 and 770, since prReservationHolder=0 (i.e., VM1 131 is the reservation holder), first VSCSI layer 120A allows and issues the write command to the backend storage, such as by passing the write command to shared physical storage system 150 using a lower layer (e.g., filesystem layer).

In contrast, according to 775-790 in FIG. 7, any write command from VM2 132 or VM3 133 will be blocked or failed. In particular, since neither VM2 132 nor VM3 133 is the reservation holder based on cached PR information 122B/122C (i.e., prReservationHolder=0), VSCSI layer 120A/120B fails a write command from VM 132/133 with a reservation conflict error. In the example in FIG. 7, no PR key is registered for VM2 133 and VM3 133, in which case read and PRIN commands are allowed. However, all write or media modification commands will be failed with a reservation conflict error.

Input/Output (I/O) Fencing

In shared virtual storage environment 100, one problem that may occur among VMs 131-133 sharing access to virtual disks 151-152 is known as a split-brain condition. For example in FIG. 5, first VSCSI layer 120A concludes that VM3 133 is not alive because VM3 133 has not updated its acknowledgement block 360 and heartbeat block 330 within HB_LEASE_TIME. In this case, first VSCSI layer 120A proceeds to access VD1 151 according to the PROUT command issued by VM1 131. However, there is a risk that VM3 133 is still up and running, and thinks that it is the only node alive. In this case, both VM1 131 and VM3 133 might attempt to access VD1 151 simultaneously, thereby causing data corruption.

According to a second aspect of the present disclosure, I/O fencing (sometimes known as disk fencing or failure fencing) may be implemented to reduce or eliminate the risk of data corruption. For example in FIG. 5, host-A 110A may perform I/O fencing to block I/O access by VM3 133 to VD1 151, thereby "fencing off" VM3 133 from VD1 151. To facilitate I/O fencing in shared virtual storage environment 100, a dedicated IT nexus or path may be created for each pair of virtual machine and virtual disk ("VM-VD" pair). An IT nexus represents a relationship between an initiator (I) and a target (T).

As will be described further below, each path associated with a VM-VD pair may be configured when the VM is powered ON and being attached to the virtual disk. A unique key or tag is also assigned to each path. This way, in response to detecting I/O commands from the VM that are destined for the virtual disk, VSCSI layer 120A/120B/120C may tag the I/O commands with the unique key for identification. Based on the unique key in the tagged command, physical disk driver 128A/128B/128C may identify the path associated with the unique key and route the command via the path accordingly.

Figure 8:
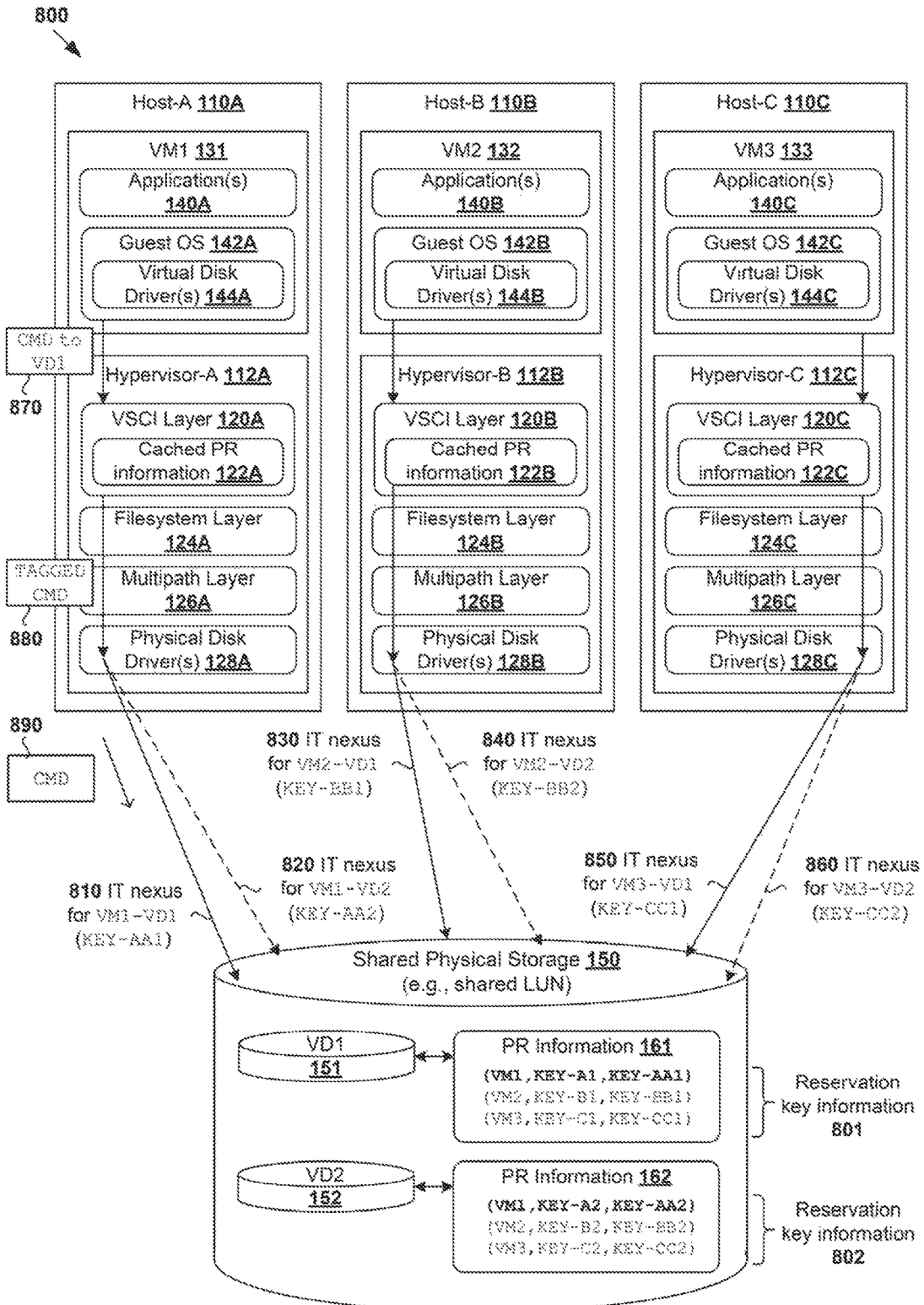
FIG. 8 is a schematic diagram illustrating an example shared virtual storage environment in which Input/Output (I/O) fencing may be performed.

In more detail, FIG. 8 is a schematic diagram illustrating example shared virtual storage environment 800 in which I/O fencing may be performed. It should be understood that, depending on the desired implementation, shared virtual storage environment 800 may include additional and/or alternative components than that shown in FIG. 8. The example in FIG. 8 will be explained using FIG. 9, which is a flowchart of example process 900 for a first host to perform reservation key configuration and command tagging in shared virtual storage environment 800. Example process 900 may include one or more operations, functions, or actions illustrated by one or more blocks, such as 910-990. The various blocks may be combined into fewer blocks, divided into additional blocks, and/or eliminated depending on the desired implementation.

It should be understood that the VO fencing approaches in FIG. 8 to FIG. 11 may be implemented together with the example PR emulation approaches in FIG. 1 to FIG. 7, or any alternative and/or additional PR emulation approach. In the following examples, I/O fencing may be implemented using any suitable host 110A/110B/110C, such as using VSCSI layer 120A/120B/120C and/or physical disk driver(s) 128A/128B/128C supported by hypervisor 112A/112B/112C, etc.

(a) Configuration

Figure 9:
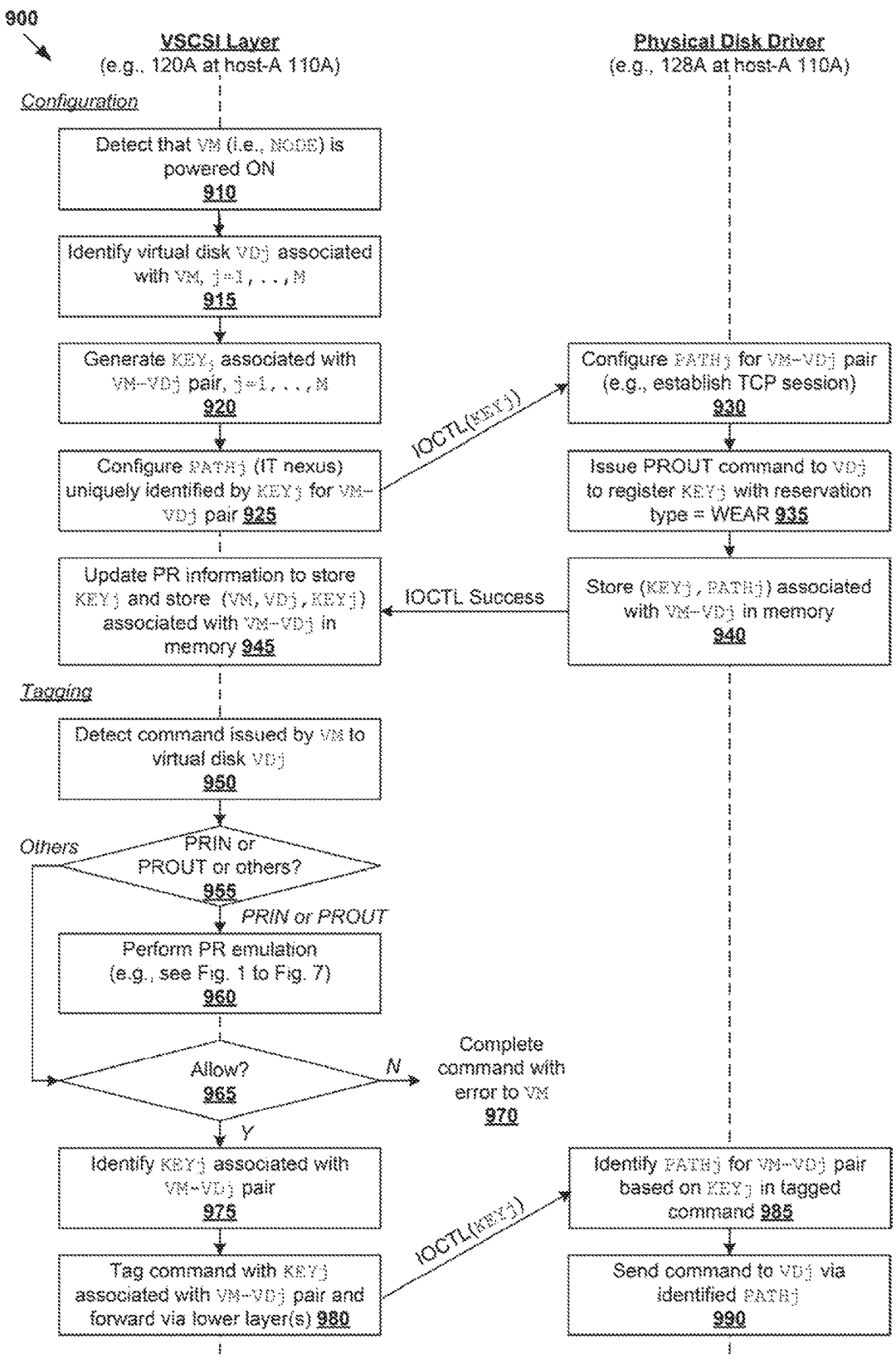
FIG. 9 is a flowchart of an example process for a first host to perform reservation key configuration and command tagging in a shared virtual storage environment.

At 910 and 915 in FIG. 9, in response to detecting that VM1 131 is powered ON, first VSCSI layer 120A identifies VD1 151 and VD2 152 to which access is required by VM1 131. Next, at 920 in FIG. 9, first VSCSI layer 120A generates a first reservation key (e.g., KEY-AA1) associated with a first path between VM1 131 and VD1 151 (see 810 in FIG. 8), and a second reservation key (e.g., KEY-AA2) associated with a second path between VM1 131 and VD2 152 (see 820 in FIG. 8).

Each reservation key is unique to a particular VM-VD pair. For example, if there are M nodes (e.g., VMs) that require access to a particular virtual disk, M unique reservation keys will be generated for the corresponding paths. Depending on the desired implementation, if there are multiple dusters running on the same set of host, the reservation keys should be unique across all dusters. The reservation keys may follow any suitable format, such as a combination of host ID (e.g., four bytes), VM ID (e.g., three bytes) and virtual disk ID (e.g., one byte). For example, first reservation key=KEY-AA1 may represent a concatenation or combination of a host ID of host-A 110A, a VM ID of VM1 131 and a virtual disk ID of VD1 151.

In practice, the host ID may be a 32-bit ID associated with a host on which a VM is running. The host ID may be acquired using any suitable approach, such as gethostid( ) on Portable Operating System Interface (POSIX) compliant systems, etc. Three bytes may be used to store the VM ID, which may a Process Identifier (PID) of a VM. On Linux-based systems, maximum PID can be set to any value up to a 2^22 (PID_MAX_LIMIT). The virtual disk ID uniquely identifies a virtual disk on a host. In practice, an array may be used to store ID information for all disks and indices of the array may be used as the virtual disk ID.

At 925 in FIG. 9, first VSCSI layer 120A then issues an Input Output Control (IOCTL) command identifying the reservation key to physical disk driver 128A. At 930 in FIG. 9, in response to receiving the IOCTL command from first VSCSI layer 120A, physical disk drive 128A creates a path for each VM-VD pair. For example in FIG. 8, first path 810 represents a first IT nexus for VM1 131 to access VD1 151, and second path 820 a second IT nexus to access VD2 152. Using iSCSI disk driver as an example, an IT nexus may be created by establishing a communication session (e.g., Transmission Control Protocol Internet Protocol (TCP/IP) session) with shared physical storage system 150 where VD1 151 is stored.

At 935 in FIG. 9, physical disk drive 128A registers reservation key KEY-AA1 with VD1 151 and KEY-AA2 with VD2 152, such as using PROUT REGISTER-AND-IGNORE command. After registering the reservation keys, reservation of type=WEAR is taken on paths 810-820. In the example in FIG. 8, PR information 161-162 is updated to store the reservation keys, such as in corresponding heartbeat blocks allocated to VM1 131. At 940, an association between each pair of reservation key and path is stored, such as KEY-AA1 associated with first path 810 and KEY-AA2 associated with second path 820.

At 945 in FIG. 9, first VSCSI layer 120A updates PR information 161-162 to store an association between each reservation key and VM-VD pair, such as (VM1, VD1, KEY-AA1) and (VM1, VD2, KEY-AA2), etc. See corresponding reservation key information 801/802 in updated PR information 161/162 in FIG. 8, which is also stored in memory. For example in FIG. 8, PR information 161 associated with VD1 151 is updated to store (VM1, KEY-A1, KEY-AA1), where "VM1" is an ID associated with VM1 131 and KEY-A1 is a reservation key with type=WERO generated by VM1 131. Further, PR information 162 associated with VD2 152 is updated to store (VM1, KEY-A2, KEY-AA2), where KEY-A2 is a reservation key with type=WERO generated by VM1 131. KEY-AA1 and KEY-AA2 are reservation keys with type=WEAR generated by first VSCSI layer 120A at 920 in FIG. 9. In practice, (VM1, KEY-AA1) may be stored in first heartbeat block 310 allocated to VM1 131 in PR information 161. Similarly, (VM1, KEY-AA2) may be stored in its allocated heartbeat block in PR information 162.

Similarly, second VSCSI layer 120B and third VSCSI layer 120C may configure reservation keys and corresponding paths for respective VM2 132 and VM3 133. For example, when VM2 132 is powered ON at host-B 110B, second VSCSI layer 120B generates KEY-BB1 for VM2 132 and VD1 151, and KEY-BB2 for VM2 132 and VD1 151. Physical disk driver 128B configures path 830 associated with KEY-BB1 for the VM2-VD1 pair and path 840 associated with KEY-BB2 for the VM2-VD2 pair. PR information 161 associated with VD1 151 is updated to store (VM2, KEY-B1, KEY-BB1), and PR information 162 associated with VD2 152 to store (VM2, KEY-B2, KEY-BB2). In practice, (VM2, KEY-BB1) may be stored in second heartbeat block 320 allocated to VM2 132 in PR information 161, and (VM2, KEY-BB2) in its allocated heartbeat block in PR information 162.

When VM3 133 is powered ON at host-C 110C, third VSCSI layer 120C generates KEY-CC1 for VM3 133 and VD1 151, and KEY-CC2 for VM3 133 and VD2 152. Physical disk driver 128C then configures path 850 for the VM3-VD1 pair, and path 860 for the VM3-VD2 pair. PR information 161 associated with VD1 151 is updated to store (VM3, KEY-C1, KEY-CC1), and PR information 162 associated with VD2 152 to store (VM3, KEY-C2, KEY-CC2). Similarly, (VM3, KEY-CC1) may be stored in third heartbeat block 330 allocated to VM3 133 in PR information 161, and (VM3, KEY-CC2) in its allocated heartbeat block in PR information 162.

In the above examples, WERO-type reservation keys (e.g., KEY-A1, KEY-B1, KEY-C1) may be used by VMs 131-133 for issuing PRIN or PROUT commands, which may be emulated using the approaches in FIG. 1 to FIG. 7. In contrast, WEAR-type reservation keys (e.g., KEY-AA1, KEY-BB1, KEY-CC1) may be used by VSCSI layers 120A-C for tagging, and physical disk drivers 128A-C for issuing commands to shared physical storage system 150. As will be discussed below, PROUT commands may be issued for the purpose of registration, reservation and pre-emption. In practice, since multiple VMs in a duster may share multiple virtual disks and multiple clusters may run on the same set of hosts, the reservation keys should be unique across all dusters.

Depending on the desired implementation, paths 810-860 are not exposed to multipath layers 126A-C such that I/O commands to virtual disks 151-152 are routed via paths 810-860 established by physical disk drivers 128A-C (i.e., not sent from multipath layers 126A-C). Although not shown in FIG. 8 for simplicity, additional paths to filesystem(s) supported by shared physical storage system 150 may be configured. These filesystem paths are configured during device discovery, and exposed to respective multipath layers 126A-C such that filesystem I/Os (untagged) processed by filesystem layers 124A-C are routed via the filesystem paths. Note that filesystem I/Os are not sent via any of paths 810-860.

In practice, paths 810-860 may be closed or removed when respective VMs 131-133 are powered OFF. This may involve VSCSI layer 120A/120B/120C sending an IOCTL command that identifies a particular reservation key. Physical disk driver 128A/128B/128C then identifies a path associated with the reservation key (e.g., path 810 associated with KEY-AA1) and removes the path accordingly. Depending on the desired implementation, physical disk driver 128A/128B/128C also updates PR information 161/162 to remove the reservation key.

(b) Tagging

According to examples of the present disclosure, reservation keys may be used by VSCSI layer 120A/120B/120C to tag commands destined for a particular virtual disk (e.g., VD1 151). This way, based on a particular reservation key (e.g., KEY-AA1), physical disk driver 128A/128B/128C may identify an associated path to that particular virtual disk (e.g., path 810 to VD1 151). Some examples will be discussed below using commands issued by VM1 131 at host-A 110A.

Referring to FIG. 9 again, at 950 and 955, in response to detecting a command issued by VM1 131 (see 870 in FIG. 8) to VD1 151, first VSCSI layer 120A determines whether the command is a PRIN command, PROUT command or other SCSI command. At 960, in the case of a PRIN or PROUT command, first VSCSI layer 120A may perform PR emulation according to the examples in FIG. 1 to FIG. 7, the explanation of which is not repeated here for brevity. PRIN and PROUT commands are emulated and not sent to the backend (i.e., shared physical storage system 150).

Other SCSI commands (i.e., non-PRIN and non-PROUT commands) may be handled according to 965-990 in FIG. 9. At 965 in FIG. 9, in response to determination that the detected command is a SCSI read or write command, first VSCSI layer 120A determines whether to allow the command to proceed. Any suitable approach may be used for the determination, such as using the examples discussed FIG. 7 (not repeated here for brevity). If not allowed, at 970, the command will be completed with reservation conflict error to VM1 131. Otherwise, at 975 and 980, first VSCSI layer 120A identifies KEY-AA1 associated with VM1 131 and VD1 151, and tags the command with KEY-AA1. The tagged command (see 880 in FIG. 8) is then forwarded to physical disk driver 128A via filesystem layer 124A and multipath layer 126A.

At 985 in FIG. 9, in response to detecting the tagged command, physical disk driver 128A retrieves the association stored at block 945 and identifies first path 810 based on KEY-AA1. Next, at 990, physical disk driver 128A sends the command via first path 810 to VD1 151 (see 890 in FIG. 8). This way, physical disk driver 128A may route the command to the appropriate path to shared physical storage system 150. In another example, if a command tagged with KEY-AA2 is received, physical disk driver 128A may identify second path 820 associated with the reservation key, and send the command via second path 820 to VD2 152. Although not shown in FIG. 9, it is not necessary to tag filesystem commands, which will be sent via a filesystem path established with shared physical storage system 150 during device discovery.

(c) I/O Fencing

According to examples of the present disclosure, I/O fencing may be performed by removing a particular reservation key associated with a particular path of a VM-VD pair. Examples of the present disclosure should be contrasted against conventional approaches that do not configure separate paths 810-860 associated with respective keys. In this case, the removal of one reservation key often blocks access to the entire shared physical storage system 150, thereby undesirably blocking I/Os to all virtual disks 151-152 as well as the filesystem.

Figure 10:
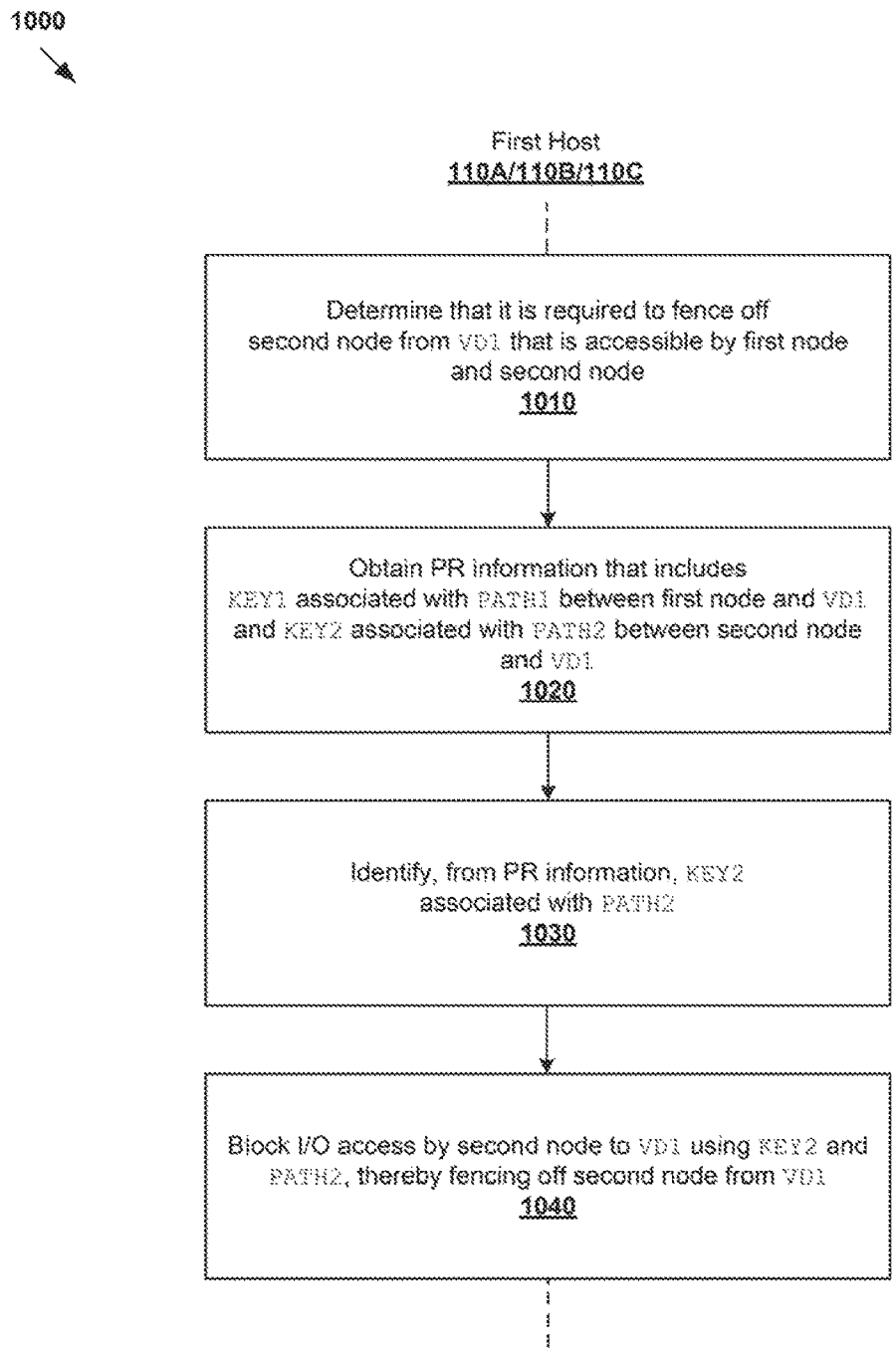
FIG. 10 is a flowchart of an example process for a first host to perform I/O fencing in a shared virtual storage environment.

In more detail, FIG. 10 is a flowchart of example process 1000 for a first host to perform I/O fencing in shared virtual storage environment 800. Example process 1000 may include one or more operations, functions, or actions illustrated by one or more blocks, such as 1010-1040. The various blocks may be combined into fewer blocks, divided into additional blocks, and/or eliminated. In the following, host-A 110A is used as an example "first host," host-C 110C as "second host," VM1 131 as "first node" and VM3 133 as "second node".

Using the example in FIG. 8, PR information 161 includes KEY-AA1 ("first key") associated with path 810 ("first path") between VM1 131 and VD1 151 ("first virtual disk"), and KEY-CC1 ("second key") associated with path 850 ("second path") between VM3 133 and VD1 151. Since dedicated paths associated with respective keys are configured, KEY-CC1 is different from KEY-CC2 ("third key") associated with path 860 ("third path") between VM3 133 and VD2 152 ("second virtual disk") stored on physical storage system 150. Similarly, KEY-AA1 is different from KEY-AA2 ("fourth key") associated with path 820 ("fourth path") between VM1 131 and VD2 152.

At 1010 in FIG. 10, host-A 110A (e.g., VSCSI layer 120A) determines that is required to fence off the VM3 133 from VD1 151. At 1020, host-A 110A obtains PR information 161 associated with the VD1 151. At 930, host-A 110A identifies, from PR information 161, KEY-CC1 associated with path 850 between VM3 133 and VD1 151. At 1040, host-A 110A blocks I/O access by VM3 133 to VD1 151 using KEY-CC1 and path 850, thereby fencing off VM3 133 from VD1 151 but not from VD2 152. As will be discussed below, block 1040 may involve issuing a PROUT PREEMPT command to pre-empt KEY-CC1, thereby removing KEY-CC1 from shared physical storage 150 (i.e., physical target). (Note that VM3 133 may continue to access VD2 152 using KEY-CC2.)

An example will be discussed using FIG. 11, which is a schematic diagram illustrating example I/O fencing according to the example in FIG. 10. In this example, consider the scenario explained using FIG. 5 where first VSCSI layer 120A has performed blocks 410-435 in FIG. 4 to update propInProgress (see 1101) in PR information 161, but an acknowledgement has not been received from non-responding VM3 133 (see 1102). In this case, to reduce or eliminate the risk of data corruption on VD1 151, first VSCSI layer 120A may fence off VM3 133 from VD1 151.

Figure 11:
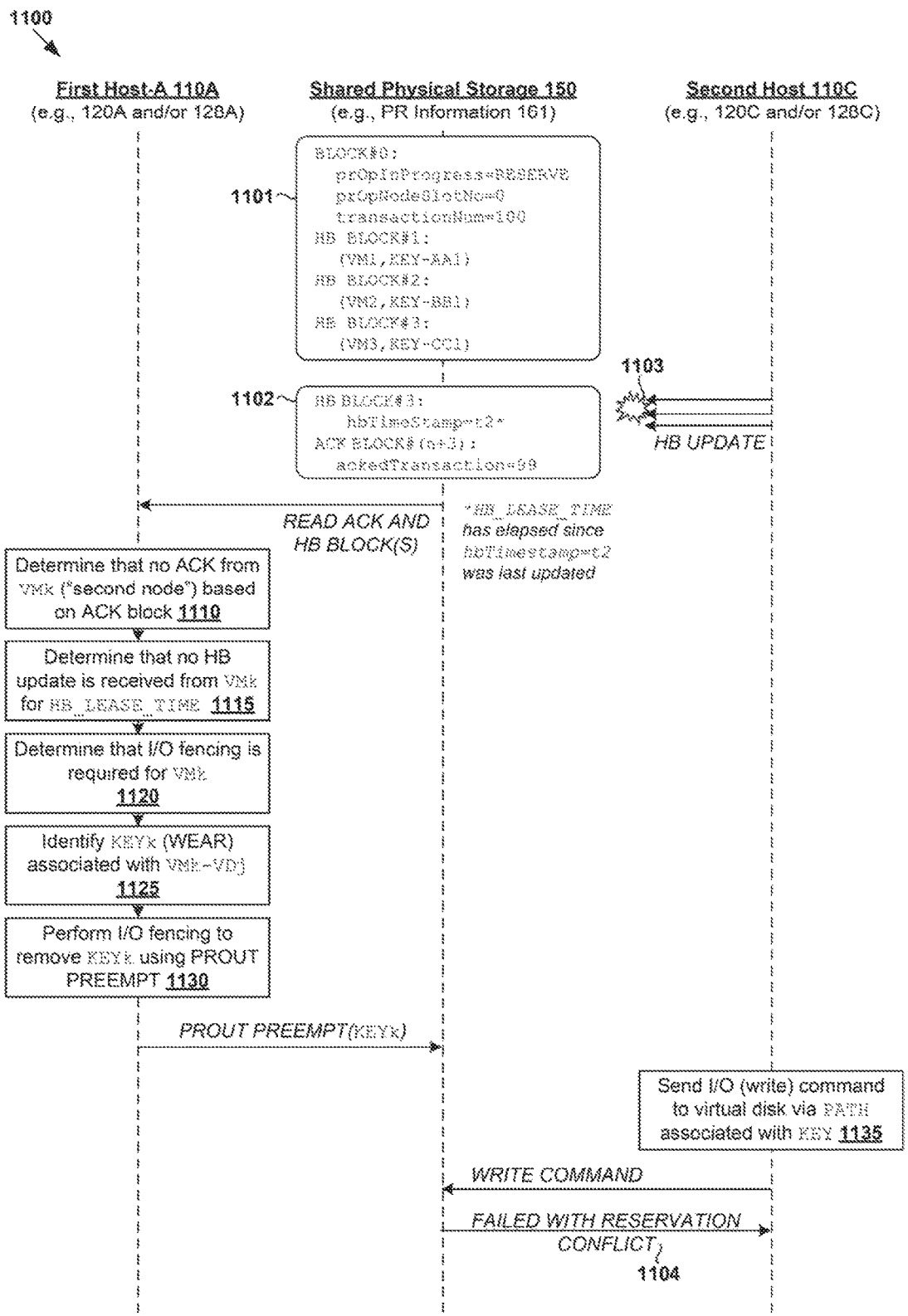
FIG. 11 is a schematic diagram illustrating example I/O fencing according to the example in FIG. 10.

At 1110 and 1115 in FIG. 11, first VSCSI layer 120A determines whether I/O fencing is required based on PR information 161. For example, similar to the examples in FIG. 4 and FIG. 5, first VSCSI layer 120A may check acknowledgement blocks 350-360 to determine whether acknowledgement has been received from VM2 132 and VM3 133. If not, first VSCSI layer 120A may further check heartbeat blocks 340-350 allocated to respective VM2 132 and VM3 133 to detect any storage connectivity loss.

In the example in FIG. 11, it is determined that VM3 133 is not responding (see 1103). In particular, at 1115, based on ackedTransaction=99 in acknowledgement block 360 allocated to VM3 133, first VSCSI layer 120A determines that acknowledgement has not been received. Further, based on hbTimeStamp in heartbeat block 330 allocated to VM3 133, first VSCSI layer 120A determines that hbTimeStamp has not been updated for a predetermined time interval (e.g., HB_LEASE_TIME). As such, at 1120 in FIG. 11, it is determined that I/O fencing is required to fence off I/O commands from VM3 133 to VD1 151.

At 1125 in FIG. 11, first VSCSI layer 120A identifies a WEAR reservation key associated with VM3 133 and VD1 151 based on (VM3, KEY-CC1) in third heartbeat block 330 allocated to VM3 133 (see also 1101). For example, this may involve identifying uniqueVmUuid="VM3" in heartbeat block 330 allocated, and searching for the reservation key in PR information block 300 (Block #0) based on the ID.

At 1130 in FIG. 11, first VSCSI layer 120A performs I/O fencing by pre-empting WEAR reservation key=KEY-CC1 associated with VM3 133 and VD1 151. In practice, block 1130 may involve first VSCSI layer 120A sending an IOCTL command specifying KEY-CC1 as one of the arguments. This causes physical disk driver 128A to generate and send a PROUT PREEMPT command to pre-empt the reservation key.

By removing KEY-CC1 associated with VM3 133 and VD1 151, write commands (or commands that modify media) on path 850 associated with KEY-CC1 will be failed by shared physical storage system 150 with a reservation conflict error (see 1104 in FIG. 11). This way, in the case of a split brain scenario, the risk of data corruption may be reduced, if not eliminated. This provides a relatively clean way to perform I/O fencing without any race conditions.

Depending on the desired implementation, I/O fencing according the examples in FIG. 10 and FIG. 11 may be performed in other scenarios. For example, consider the scenario in FIG. 6 where a master node is not responding while prOpInProgress=REGISTER_AND_IGNORE is in progress. In this case, second VSCSI layer 120B may determine that VM1 131 has lost storage connectivity in response to determination that hbTimeStamp in heartbeat block 310 allocated to VM1 131 has not been updated for HB_LEASE_TIME. As such, at 635 in FIG. 6, second VSCSI layer 120B may reset propInProgress and perform I/O fencing by issuing a PROUT PREEMPT command to block I/O access by VM1 131 to VD1 151 using reservation key=KEY-AA1 and path 810.

Other I/O Fencing Examples

It should be understood that the example PR emulation approaches in FIG. 1 to FIG. 7 may be used any suitable I/O fencing approaches (i.e., not limited to the examples in FIG. 8 to FIG. 11). Another example will be discussed below.

To fence I/Os from a non responding VM, another approach is to use PR reservation of type WEAR (Write Exclusive All Registrants) on a physical disk where the shared virtual disk is stored. During filesystem mount, VMFS may register a SCSI-3 PR key with the physical disk. The key may be unique per physical host in a cluster and stored in a PR file. Each VM sharing a virtual disk stores its key in its allocated heartbeat block. In practice, the key may be unique for each host in the cluster. For example, each key may be 8 bytes in length (as per the SCSI specification). On a Linux-based system, a 32-bit "hostid" (returned by gethostid( )) may be used as key.

Reservation and pre-emption may be performed as follows. When a shared virtual disk is attached during VM Power ON, a VSCSI layer may issue a filesystem IOCTL command to take reservation of type WEAR on the physical disk. After the reservation is taken, the VSCSI layer stores the key in the PR file. To fence all I/Os from a host, its WEAR key will be pre-empted by any other registered host. For example, if a VM doesn't respond during a PROUT Transaction, a coordinator node may pre-empt the WEAR key using filesystem IOCTL (the coordinator node may obtain the WEAR key of a non-responding VM by reading a sidecar file). This blocks all media modification commands from the non-responding VM to ensure data on shared virtual disk is not corrupted. As a side effect, write commands from other VMs and filesystem are also blocked, but as the host connectivity with the storage is lost, this should not be an issue.

After key removal, an attempt to issue a write command will cause a reservation conflict error. In this case, VMFS becomes aware that its WEAR key has been removed. Before allowing the media modification commands from a particular node, VMFS ensures that there is no pending I/Os for any shared virtual disks on that datastore. In this case, VMFS may invoke an API supported by the VSCSI layer to get confirmation as to whether all shared virtual disks are quiesced and no command is pending completion from the backend. Once all relevant shared virtual disks are quiesced, the VSCSI layer acknowledges the VMFS using an IOCTL command. The VMFS may then register the key again and take reservation when storage access is restored. The above example assumes that the backend storage on which shared virtual disks are stored support ATS commands and SCSI-3 PR commands.

Container Implementation

Although discussed using VMs 131-133 as example nodes, it should be understood that PR emulation and/or 110 fencing may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 11. For example, a computer system capable of acting as a host may be deployed in shared virtual storage environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a first host to perform persistent reservation emulation in a shared virtual storage environment that includes the first host supporting a first node and a second host supporting a second node, wherein the method comprises:
  detecting a command issued by the first node to update information relating to a reservation or registration associated with a virtual disk, wherein the virtual disk that is stored on a physical storage system and accessible by the first node and the second node;
  updating persistent reservation information associated with the virtual disk to indicate that the command has been issued by the first node, wherein the persistent information is accessible by the first host and the second host;
  determining that the second node either has acknowledged the updated persistent reservation information, or has not acknowledged the updated persistent reservation information within a time interval; and
  updating the persistent reservation information based on the command.

2. The method of claim 1, wherein the method further comprises:
  prior to updating persistent reservation information, determining to allow the command based on the persistent reservation information that indicates the second node has not issued a prior command to the virtual disk to update the information relating to the reservation or registration associated with the virtual disk.

3. The method of claim 1, wherein determining that the second node either has acknowledged the updated persistent reservation information, or has not acknowledged the updated persistent reservation information within the time interval comprises:
  obtaining a latest copy of the persistent reservation information that includes an acknowledgement block allocated to the second node; and
  in response to determination that the acknowledgement block has been updated based on the updated persistent reservation information, determining that the second node has acknowledged the updated persistent reservation information and at least one of, aborting any in-flight commands and blocking any new commands to the virtual disk.

4. The method of claim 1, wherein the second node either has acknowledged the updated persistent reservation information, or has not acknowledged the updated persistent reservation information within the time interval comprises:
  obtaining a latest copy of the persistent reservation information that includes an acknowledgement block and a heartbeat block allocated to the second node; and
  in response to determination that the acknowledgement block has not been updated based on the updated persistent reservation information and the heartbeat block has not been updated within the time interval, determining that the second node has not acknowledged the updated persistent reservation information within the time interval.

5. The method of claim 1, wherein updating the persistent reservation information to indicate that the command has been issued comprises:
  updating one or more of the following parameters in the persistent reservation information: a first parameter to indicate that the command has been issued, a second parameter to identify the first node, and a third parameter to indicate a transaction number associated with the command.

6. The method of claim 1, wherein the method further comprises:
  in response to detecting a command issued by the first node to read information relating to a reservation or registration associated with the virtual disk, generating and sending a response to the first node based on a cached copy of the persistent reservation information.

7. The method of claim 1, wherein the method further comprises:
  updating a heartbeat block allocated to the first node in the persistent reservation information; and
  in response to determination that the heartbeat block has not been successfully updated, at least one of, aborting any in-flight commands and blocking any new commands to the virtual disk.

8. A non-transitory computer-readable storage medium that includes a set of instructions which, in response to execution by a processor of a first host, cause the processor to perform a method of persistent reservation emulation in a shared virtual storage environment that includes the first host supporting a first node and a second host supporting a second node, wherein the method comprises:
  detecting a command issued by the first node to update information relating to a reservation or registration associated with a virtual disk, wherein the virtual disk that is stored on a physical storage system and accessible by the first node and the second node;
  updating persistent reservation information associated with the virtual disk to indicate that the command has been issued by the first node, wherein the persistent information is accessible by the first host and the second host;
  determining that the second node either has acknowledged the updated persistent reservation information, or has not acknowledged the updated persistent reservation information within a time interval; and
  updating the persistent reservation information based on the command.

9. The non-transitory computer-readable storage medium of claim 8, wherein the method further comprises:
  prior to updating persistent reservation information, determining to allow the command based on the persistent reservation information that indicates the second node has not issued a prior command to the virtual disk to update the information relating to the reservation or registration associated with the virtual disk.

10. The non-transitory computer-readable storage medium of claim 8, wherein determining that the second node either has acknowledged the updated persistent reservation information, or has not acknowledged the updated persistent reservation information within the time interval comprises:
  obtaining a latest copy of the persistent reservation information that includes an acknowledgement block allocated to the second node; and
  in response to determination that the acknowledgement block has been updated based on the updated persistent reservation information, determining that the second node has acknowledged the indication and at least one of, aborting any in-flight commands and blocking any new commands to the virtual disk.

11. The non-transitory computer-readable storage medium of claim 8, wherein the second node either has acknowledged the updated persistent reservation information, or has not acknowledged the updated persistent reservation information within the time interval comprises:
- obtaining a latest copy of the persistent reservation information that includes an acknowledgement block and a heartbeat block allocated to the second node; and
- in response to determination that the acknowledgement block has not been updated based on the updated persistent reservation information and the heartbeat block has not been updated within the time interval, determining that the second node has not acknowledged the updated persistent reservation information within the time interval.

12. The non-transitory computer-readable storage medium of claim 8, wherein updating the persistent reservation information to indicate that the command has been issued comprises:
- updating one or more of the following parameters in the persistent reservation information: a first parameter to indicate that the command has been issued, a second parameter to identify the first node, and a third parameter to indicate a transaction number associated with the command.

13. The non-transitory computer-readable storage medium of claim 8, wherein the method further comprises:
- in response to detecting a command issued by the first node to read information relating to a reservation or registration associated with the virtual disk, generating and sending a response to the first node based on a cached copy of the persistent reservation information.

14. The non-transitory computer-readable storage medium of claim 8, wherein the method further comprises:
- updating a heartbeat block allocated to the first node in the persistent reservation information; and
- in response to determination that the heartbeat block has not been successfully updated, at least one of, aborting any in-flight commands and blocking any new commands to the virtual disk.

15. A first host, comprising:
- a processor; and
- a non-transitory computer-readable medium having stored thereon instructions that, when executed by the processor, cause the processor to perform the following in a shared virtual storage environment that includes the first host, and a second host:
- detect a command issued by a first node supported by the first host to update information relating to a reservation or registration associated with a virtual disk, wherein the virtual disk that is stored on a physical storage system and accessible by the first node and a second node supported by the second host;
- update persistent reservation information associated with the virtual disk to indicate that the command has been issued by the first node, wherein the persistent information is accessible by the first host and the second host;
- determine that the second node either has acknowledged the updated persistent reservation information, or has not acknowledged the updated persistent reservation information within a time interval; and
- update the persistent reservation information based on the command.

16. The first host of claim 15, wherein the instructions further cause the first host to:
- prior to updating persistent reservation information, determine to allow the command based on the persistent reservation information that indicates the second node has not issued a prior command to the virtual disk to update the information relating to the reservation or registration associated with the virtual disk.

17. The first host of claim 15, wherein the instructions for determining that the second node either has acknowledged the updated persistent reservation information, or has not acknowledged the updated persistent reservation information within the time interval cause the first host to:
- obtain a latest copy of the persistent reservation information that includes an acknowledgement block allocated to the second node; and
- in response to determination that the acknowledgement block has been updated based on the updated persistent reservation information, determine that the second node has acknowledged the indication and at least one of, aborting any in-flight commands and blocking any new commands to the virtual disk.

18. The first host of claim 15, wherein the instructions for determining that the second node either has acknowledged the updated persistent reservation information, or has not acknowledged the updated persistent reservation information within the time interval cause the first host to:
- obtain a latest copy of the persistent reservation information that includes an acknowledgement block and a heartbeat block allocated to the second node; and
- in response to determination that the acknowledgement block has not been updated based on the updated persistent reservation information and the heartbeat block has not been updated within the time interval, determine that the second node has not acknowledged the updated persistent reservation information within the time interval.

19. The first host of claim 15, wherein the instructions for updating the persistent reservation information to indicate that the command has been issued cause the first host to:
- update one or more of the following parameters in the persistent reservation information: a first parameter to indicate that the command has been issued, a second parameter to identify the first node, and a third parameter to indicate a transaction number associated with the command.

20. The first host of claim 15, wherein the instructions further cause the first host to:
- in response to detecting a command issued by the first node to read information relating to a reservation or registration associated with the virtual disk, generate and send a response to the first node based on a cached copy of the persistent reservation information.

21. The host of claim 15, wherein the instructions further cause the host to:
- update a heartbeat block allocated to the first node in the persistent reservation information; and
- in response to determination that the heartbeat block has not been successfully updated, at least one of, abort any in-flight commands and block any new commands to the virtual disk.

* * * * *